US012487969B1

(12) United States Patent
Qiu et al.

(10) Patent No.: US 12,487,969 B1
(45) Date of Patent: Dec. 2, 2025

(54) FAST TRUNCATION OF LARGE FILES

(71) Applicant: Cohesity, Inc., San Jose, CA (US)

(72) Inventors: Zhihuan Qiu, Lake Oswego, OR (US);
Nandan Paramashiva, San Jose, CA (US);
Siming Liu, San Jose, CA (US);
Siddesh Shinde, San Jose, CA (US)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 19/002,050

(22) Filed: Dec. 26, 2024

(51) Int. Cl.
*G06F 16/16* (2019.01)
*G06F 16/17* (2019.01)
*G06F 16/31* (2019.01)

(52) U.S. Cl.
CPC ........ *G06F 16/162* (2019.01); *G06F 16/1727* (2019.01); *G06F 16/322* (2019.01)

(58) Field of Classification Search
CPC .. G06F 16/162; G06F 16/322; G06F 16/1727; G06F 16/11; G06F 16/14; G06F 16/113; G06F 16/128; G06F 16/134; G06F 16/2246; G06F 16/2343; G06F 11/1446; G06F 11/1448; G06F 2201/80; G06F 2201/84
USPC .................................................. 707/609, 651
See application file for complete search history.

(56) References Cited

U.S. PATENT DOCUMENTS

| | | | | |
|---|---|---|---|---|
| 8,176,013 B2 * | 5/2012 | Passey | ..................... | G06F 16/13 707/656 |
| 8,996,797 B1 * | 3/2015 | Zheng | ................. | G06F 16/2246 711/163 |
| 9,720,947 B2 * | 8/2017 | Aron | ..................... | G06F 16/128 |
| 9,824,095 B1 * | 11/2017 | Taylor | ..................... | G06F 16/11 |
| 10,664,461 B2 * | 5/2020 | Qiu | .......................... | G06F 16/11 |
| 11,989,103 B2 * | 5/2024 | David | ................. | G06F 16/2246 |
| 12,242,353 B2 | 3/2025 | Lee | | |
| 12,271,625 B1 * | 4/2025 | Astolfi | ............... | G06F 16/2246 |
| 2007/0094277 A1 * | 4/2007 | Fachan | ............... | G06F 16/2246 |
| 2014/0013046 A1 * | 1/2014 | Corbett | ................. | G06F 16/128 711/112 |
| 2015/0370502 A1 * | 12/2015 | Aron | ................... | G06F 11/1446 |

FOREIGN PATENT DOCUMENTS

| | | | | |
|---|---|---|---|---|
| WO | WO2016124959 A1 * | 11/2016 | ........... | G06F 16/184 |
| WO | WO2020005855 A1 * | 2/2020 | ......... | G06F 16/2246 |

\* cited by examiner

*Primary Examiner* — Shahid A Alam

(74) *Attorney, Agent, or Firm* — Shumaker & Sieffert, P.A.

(57) ABSTRACT

Techniques are described for fast large file truncation. An example method includes receiving, by a data platform, a request to truncate a file, wherein data of the file is stored in a tree data structure including a plurality of nodes with leaf nodes corresponding to data of the file; determining a first node of the plurality of nodes including a plurality of child nodes; determining, based on a maximum key, a subset of the child nodes corresponding to a portion of the data that is to be retained; based on determining not to traverse the first node, updating a second node that is a parent of the first node to include a pointer to each child node of the subset of child nodes; and moving, from a subset of leaf nodes referenced by the subset of child nodes, a leaf node to rebalance the tree data structure.

20 Claims, 12 Drawing Sheets

FAST TRUNCATION OF LARGE FILES

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a distributed storage system is often relied upon to support secondary use cases such as backup and archive. Some distributed storage systems may not be ideal for latency sensitive operations.

SUMMARY

Aspects of this disclosure describe techniques for fast truncation of objects such as large files. File system data, such as objects, may be divided into smaller portions or chunks. For example, a plurality of individual chunks in one or more chunkfiles may together contain the data of an object of the file system. The object may be represented by a tree data structure having leaf, child, parent, grandparent, etc. nodes where the portions (e.g., chunks) of the object may be located by traversing the tree data structure to corresponding leaf nodes of the tree data structure.

The techniques described herein perform fast truncation of large files. For example, rather than traversing and updating nodes of a tree data structure individually to truncate an object, a data platform may perform a trimming process where subtrees of the tree data structure may be dereferenced by dereferencing ancestor nodes that do not correspond (e.g., reference) data of the object that is to be retained. The data platform may subsequently perform a rebalancing process to rebalance the tree data structure according to one or more constraints (e.g., degree constraints, key constraints) of the tree data structure.

The techniques of this disclosure may provide one or more technical advantages that realize one or more practical applications. For example, rather than requiring a linear run time (e.g., O(n) time) to truncate an object by traversing and updating nodes on an individual basis, the data platform may perform truncation in logarithmic time, such as may be denoted as O(log(n)) in Big O notation, or better. As will be described further below, rather than deleting and/or updating nodes individually (e.g., one by one), the data platform may truncate an object by trimming multiple nodes of a tree data structure for the object, such as by dereferencing entire portions of the tree data structure. The data platform may rebalance the trimmed tree data structure such as to maintain the efficiency (e.g., low resource consumption) of traversal, search, truncation, and other operations the data platform may perform on the tree data structure. In this manner, the data platform may perform truncation on demand rather than utilizing a background garbage collection which may not perform truncation in line with user requests.

Although the techniques described in this disclosure are primarily described with respect to a backup function of a data platform (e.g., validating backups in the form of snapshots), similar techniques may be applied for an archive function (e.g., validating archives) or other similar function of the data platform. In some examples, the techniques described herein may be used to validate file system data in a live file system, in addition to validating backups or archives.

In one example, this disclosure describes a method including: receiving, by a data platform implemented by a computing system, a request to truncate a file, wherein data of the file is stored in a tree data structure including a plurality of nodes, wherein a plurality of leaf nodes of the plurality of nodes include one or more indications of the data of the file; determining, by the data platform, a first node of the plurality of nodes, the first node including a plurality of child nodes; determining, by the data platform and based on a maximum key, the maximum key determined based on the request to truncate the file, a subset of the child nodes corresponding to a portion of the data that is to be retained; determining, by the data platform, whether to traverse the first node based on a level of the first node and a number of nodes in the subset of child nodes; based on determining not to traverse the first node, updating, by the data platform, a second node of the plurality of nodes that is a parent of the first node to include a pointer to each child node of the subset of child nodes; and moving, by the data platform and from a subset of the plurality of leaf nodes referenced by the subset of child nodes, at least one leaf node between a first child node of the subset of child nodes and a second child node of the subset of child nodes to rebalance the tree data structure.

In another example, this disclosure describes a computing system including: a memory storing instructions; and processing circuitry that executes the instructions to: receive a request to truncate a file, wherein data of the file is stored in a tree data structure including a plurality of nodes, wherein a plurality of leaf nodes of the plurality of nodes include one or more indications of the data of the file; determine a first node of the plurality of nodes, the first node including a plurality of child nodes; determine, based on a maximum key, the maximum key determined based on the request to truncate the file, a subset of the child nodes corresponding to a portion of the data that is to be retained; determine whether to traverse the first node based on a level of the first node and a number of nodes in the subset of child nodes; based on determining not to traverse the first node, update a second node of the plurality of nodes that is a parent of the first node to include a pointer to each child node of the subset of child nodes; and move, from a subset of the plurality of leaf nodes referenced by the subset of child nodes, at least one leaf node between a first child node of the subset of child nodes and a second child node of the subset of child nodes to rebalance the tree data structure.

In another example, this disclosure describes non-transitory computer-readable storage media including instructions that, when executed, cause processing circuitry of a computing system to: receive a request to truncate a file, wherein data of the file is stored in a tree data structure including a plurality of nodes, wherein a plurality of leaf nodes of the plurality of nodes include one or more indications of the data of the file; determine a first node of the plurality of nodes, the first node including a plurality of child nodes; determine, based on a maximum key, the maximum key determined based on the request to truncate the file, a subset of the child nodes corresponding to a portion of the data that is to be retained; determine whether to traverse the first node based on a level of the first node and a number of nodes in the subset of child nodes; based on determining not to traverse the first node, update a second node of the plurality of nodes that is a parent of the first node to include a pointer to each child node of the subset of child nodes; and move, from a subset of the plurality of leaf nodes referenced by the subset of child nodes, at least one leaf node between a first child node of the subset of child nodes and a second child node of the subset of child nodes to rebalance the tree data structure.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference characters denote like elements throughout the text and figures.

DETAILED DESCRIPTION

Figure 1A:
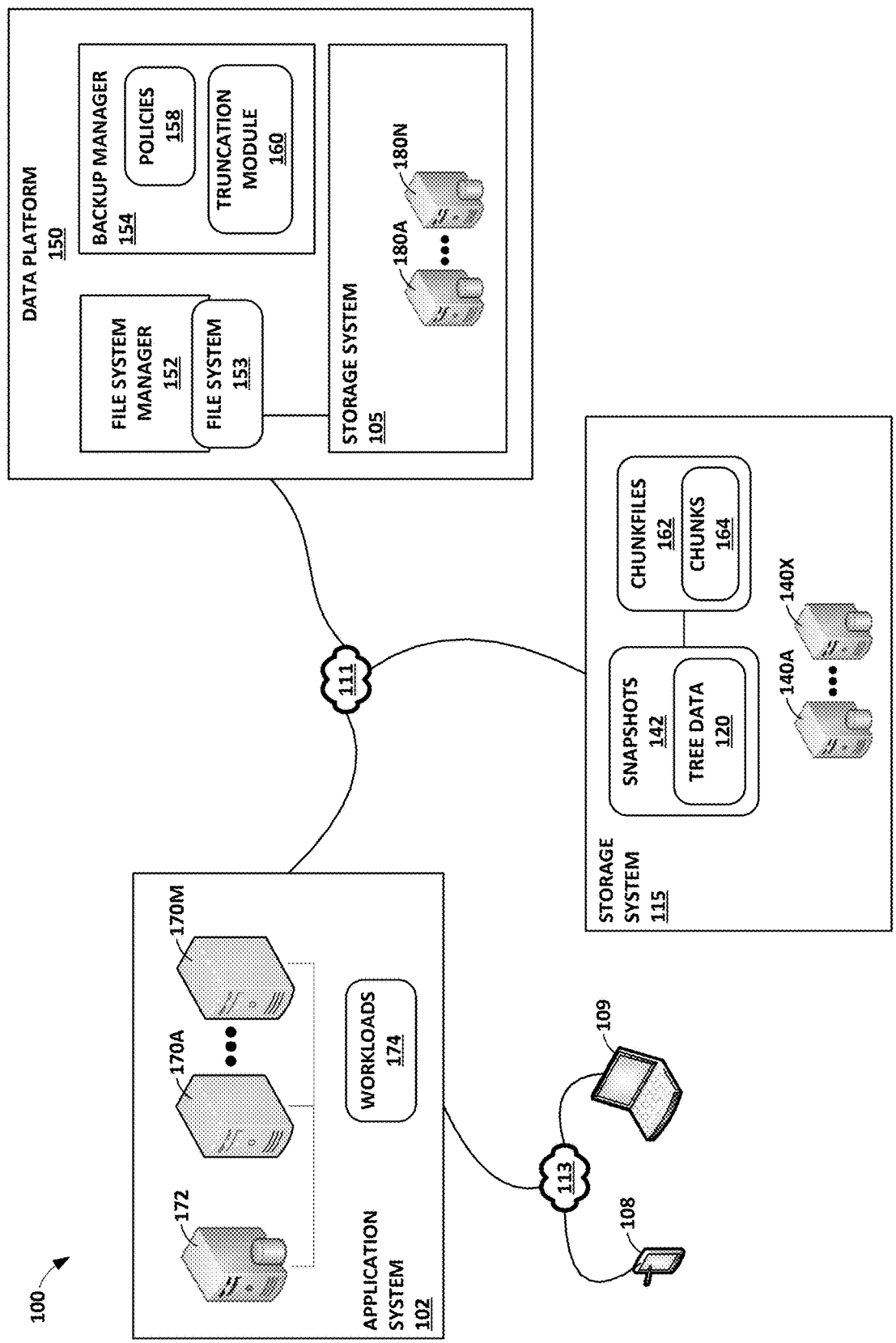
FIGS. 1A-1B are block diagrams illustrating example systems that perform fast truncation of large files, in accordance with one or more aspects of the present disclosure.
Figure 1B:
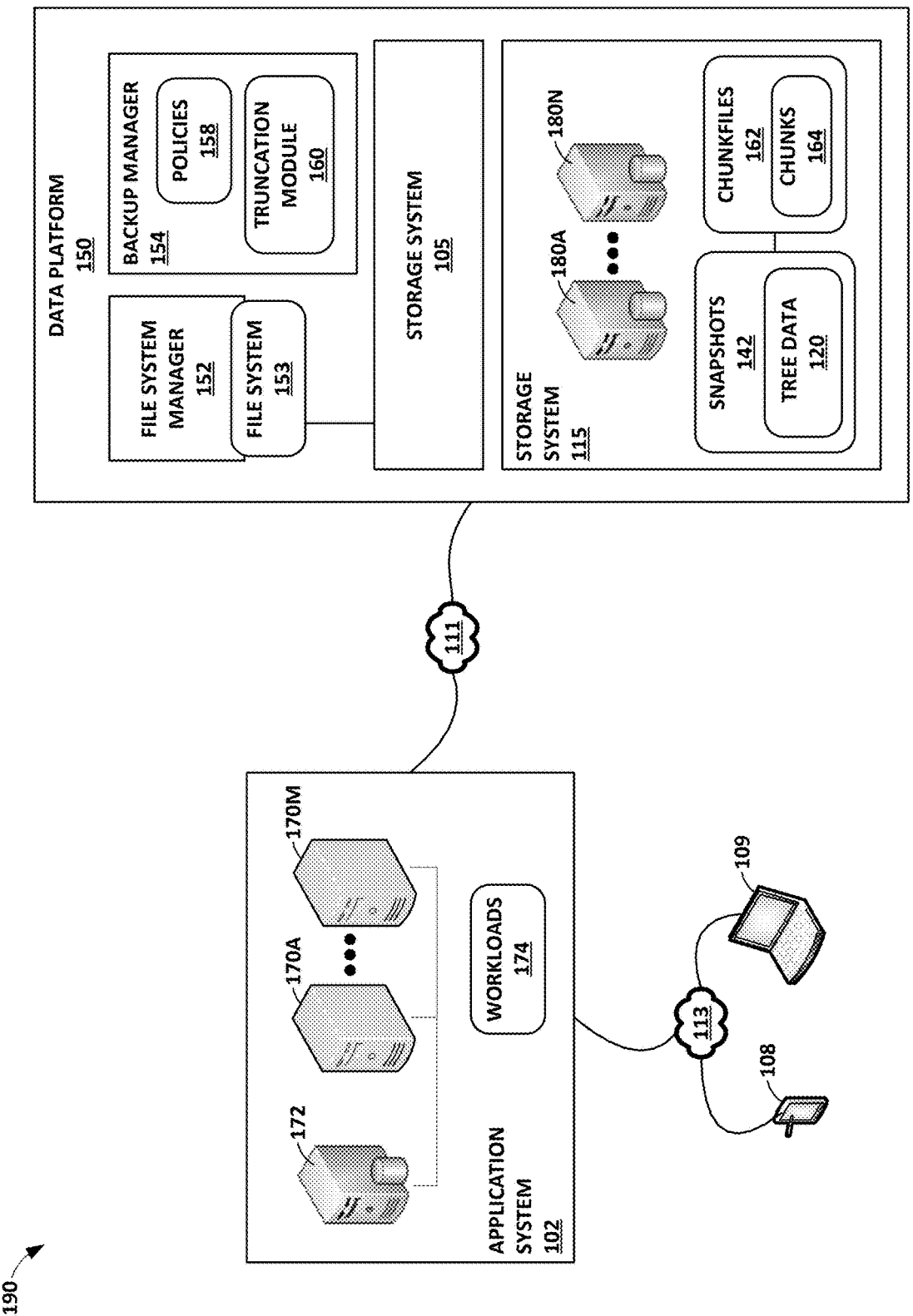

FIGS. 1A-1B are block diagrams illustrating example systems that incrementally determine checksums for a snapshot, in accordance with one or more aspects of the present disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that provides a file system 153 and backup functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152 and backup manager 154 in the example of system 100. In some examples, separate compute devices (not shown) execute software for data platform 150, such as file system manager 152 and backup manager 154 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Snapshots 142 or backups created in accordance with a protection policy inherit the data lock period and retention period specified by the protection policy.

Each of network 113 and network 111 may be the internet or may include or represent any public or private communications network or other network. For instance, network 113 may be a cellular, WI-FI, ZIGBEE, BLUETOOTH, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIGS. 1A-1B may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1A-1B or otherwise on network 113 and/or network 111 may be in a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," and file system 153 for application system 102 may alternatively be referred to as a "source file system." Application system 102 may for some purposes communicate directly with storage system 105 via network 111 to transfer objects, and for some purposes communicate with file system manager 152 via network 111 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. As shown in the example of FIG. 1A for instance, storage system 105 may store metadata for file system 153 in a tree data structure. Objects that are stored may include files, virtual machines, databases, applications, pods, container, any of workloads 174, system images, directory information, or other types of objects used by application system 102. Objects of different types and objects of a same type may be deduplicated with respect to one another.

Data platform 150 includes backup manager 154 that provides backups of file system data for file system 153. In the example of system 100, backup manager 154 stores one or more backups or snapshots 142 of file system data, stored by storage system 105, to storage system 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed and managed by a cloud storage provider and referred to as a "cloud storage system." Example cloud storage providers include, e.g., AMAZON WEB SERVICES (AWS) by AMAZON, INC., AZURE by MICROSOFT, INC., DROPBOX by DROPBOX, INC., ORACLE CLOUD by ORACLE, INC., and GOOGLE CLOUD PLATFORM (GCP) by GOOGLE, INC. In some examples, storage system 115 is co-located with storage system 105 in a data center, on-prem, or in a private, public, or hybrid private/public cloud. Storage system 115 may be considered a "backup" or "secondary" storage system for primary storage system 105. Storage system 115 may be referred to as an "external target" for snapshots 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on primary storage system 105 to support latency sensitive applications. However, because storage system 105 is often more difficult or expensive to scale, data platform 150 may use secondary storage system 115 to support secondary use cases such as backup and archive. In general, a file system backup or snapshot 142 is a copy of file system 153 to support protecting file system 153 for quick recovery, often due to some data loss in file system 153, and a file system archive ("archive") is a copy of file system 153 to support longer term retention and review. The "copy" of file system 153 may include such data as is needed to restore or view file system 153 in its state at the time of the backup or archive.

Backup manager 154 may backup file system data for file system 153 at any time in accordance with backup policies that specify, for example, backup periodicity and timing (daily, weekly, etc.), which file system data is to be backed up, a backup retention period, storage location, access control, and so forth. An initial backup of file system data corresponds to a state of the file system data at an initial backup time (the backup creation time of the initial backup). The initial backup may include a full backup of the file system data or may include less than a full backup of the file system data, in accordance with backup policies. For example, the initial backup may include all objects of file system 153 or one or more selected objects of file system 153.

One or more subsequent incremental backups of the file system 153 may correspond to respective states of the file system 153 at respective subsequent backup creation times, i.e., after the backup creation time corresponding to the initial backup. A subsequent backup may include an incremental backup of file system 153. A subsequent backup may correspond to an incremental backup of one or more objects of file system 153. Some of the file system data for file system 153 stored on storage system 105 at the initial backup creation time may also be stored on storage system 105 at the subsequent backup creation times. A subsequent incremental backup may include data that was not previously stored in a backup at storage system 115. File system data that is included in a subsequent backup may be deduplicated by backup manager 154 against file system data that is included in one or more previous backups, including the initial backup, to reduce the amount of storage used. (Reference to a "time" in this disclosure may refer to dates and/or times. Times may be associated with dates. Multiple backups may occur at different times on the same date, for instance.)

In system 100, backup manager 154 stores backups of file system data to storage system 115 as snapshots 142, using chunkfiles 162. Backup manager 154 may use any of snapshots 142 to subsequently restore the file system (or portion thereof) to its state at the snapshot creation time, or the snapshot may be used to create or present a new file system (or "view") based on the snapshot, for instance. As noted above, backup manager 154 may deduplicate file system data included in a subsequent snapshot against file system data that is included in one or more previous snapshots. For example, a second object of file system 153 included in a second snapshot may be deduplicated against a first object of file system 153 and included in a first, earlier snapshot. Backup manager 154 may remove a data chunk ("chunk") of the second object and generate metadata with a reference (e.g., a pointer) to a stored chunk of chunks 164 in one of chunkfiles 162. The stored chunk in this example is an instance of a chunk stored for the first object.

Backup manager 154 may apply deduplication as part of a write process of writing (i.e., storing) an object of file system 153 to one of snapshots 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, backup manager 154 can compute chunks having chunk sizes within the range of 16-48 kilobytes (KBs). Backup manager 154 may eschew deduplication for objects that that are less than 16 KBs. In some example implementations, when data of an object is being considered for deduplication, backup manager 154 compares a chunk identifier (ID) (e.g., a hash value of the entire chunk) of the data to existing chunk IDs for already stored chunks. If a match is found, backup manager 154 updates metadata for the object to point to the matching, already stored chunk. If no matching chunk is found, backup manager 154 writes the data of the object to storage as one of chunks 164 for one of chunkfiles 162. Backup manager 154 additionally stores the chunk ID in chunk metadata, in association with the new stored chunk, to allow for future deduplication against the new stored chunk. In general, chunk metadata is usable for generating, viewing, retrieving, or restoring objects stored as chunks 164 (and references thereto) within chunkfiles 162, for any of snapshots 142, and is described in further detail below.

Each of chunkfiles 162 includes multiple chunks 164. Chunkfiles 162 may be fixed size (e.g., 8 MB) or variable size. Chunkfiles 162 may be stored co-located with snapshot metadata, such as tree data 120. In some cases, chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system.

The process of deduplication for multiple objects over multiple snapshots results in chunkfiles 162 that each have multiple chunks 164 for multiple different objects associated with the multiple snapshots. In some examples, different snapshots 142 may have objects that are effectively copies of the same data, e.g., for an object of the file system that has not been modified. An object of a snapshot may be represented or "stored" as metadata having references to chunks that enable the object to be accessed. Accordingly, description herein to a snapshot 142 "storing," "having," or "including" an object includes instances in which the snapshot does not store the data for the object in its native form.

A user or application associated with application system 102 may have access (e.g., read or write) to data that is stored in storage system 115. The user or application may delete some of the data due to a malicious attack (e.g., virus, ransomware, etc.), a rogue or malicious administrator, and/or human error. The user's credentials may be compromised and as a result, the data that is stored in storage system 115 may be subject to ransomware. To reduce the likelihood of accidental or malicious data deletion or corruption, a data lock having a data lock period may be applied to a snapshot.

As described above, chunkfiles 162 may represent an object in a snapshot storage system (shown as "storage system 115," which may also be referred to as "snapshot storage system 115") that conform to an underlying architecture of snapshot storage system 115. Data platform 150 includes backup manager 154 that supports backing up data in the form of chunkfiles 162, which interface with snapshot storage system 115 to store chunkfiles 162 after forming chunkfiles 162 from one or more chunks 164 of data. Backup manager 154 may apply a process referred to as "deduplication" with respect to chunks 164 to remove redundant chunks and generate metadata linking redundant chunks to previously stored chunks 164 and thereby reduce storage consumed (and thereby reduce storage costs in terms of storage required to store the chunks).

Backup manager 154 may organize and store file system data (e.g., one or more objects or metadata) as tree data 120. In some examples, backup manager 154 may store tree data 120 on storage system 115. Tree data 120 may represent one or more tree data structures including nodes referenced (e.g., linked) by pointers. Backup manager 154 may store tree data 120 including a tree data structure storing file system data (e.g., objects or metadata) of a file system at one or more nodes of the tree data structure. Backup manager 154 may traverse the tree data 120 to locate file system data (e.g., objects or metadata of the file system). In some examples, backup manager 154 may organize tree data 120 into one or more separate tree data structures. For example, backup manager 154 may store tree data 120 comprising a tree data structure for metadata and a separate tree data structure for objects. As another example, backup manager 154 may store tree data 120 including a first tree data structure for a first object and a second tree data structure for a second object. Backup manager 154 may store tree data 120 comprising one or more tree data structures within another tree data structure (e.g., nested tree data structure or a subtree).

Snapshot 142 may include tree data 120 (e.g., tree data 120 may be used to store one or more snapshots 142). Each snapshot 142 may record or store the state of file system 153 at different times. For example, backup manager 154 may store tree data 120 including a first snapshot 142 of the state of an entire file system at a first time and a second snapshot 142 including incremental changes to the file system since the first snapshot. In some examples, backup manager 154 may store tree data 120 including one or more snapshots 142 of the state of an entire file system and one or more snapshots 142 including incremental changes to the file system since an earlier snapshot.

Backup manager 154 may traverse tree data 120 of snapshot 142 to retrieve a copy (e.g., backup) of the file system (e.g., the file system data of the file system) at a particular time, such as a time requested by a user. For example, backup manager 154 may locate a snapshot having a timestamp matching the time requested by the user (or other time) and traverse tree data 120 starting from a root node thereof to retrieve data for the snapshot. Backup manager 154 may retrieve one or more incremental or entire snapshots of a file system while traversing tree data 120. Backup manager 154 may apply incremental snapshots to an earlier incremental or full snapshot to generate or output a copy of the file system for the particular time. Additional examples and techniques for storage and retrieval of file system data in a tree structure are described in "MAINTAINING AND UPDATING A BACKUP VIEW OF AN APPLICATION AND ITS ASSOCIATED OBJECTS," U.S. patent application Ser. No. 17/960,515, filed Oct. 5, 2022, the entire contents of which are hereby incorporated by reference.

A tree data structure within tree data 120 may include a plurality of nodes where individual nodes reference one or more other nodes, such as through one or more pointers which reference the other nodes. The tree structure may comprise a hierarchy of nodes, such as in a grandparent node, parent node, child node, grandchild node hierarchy. In some examples, a tree data structure may include a root node that may represent a grandparent node, one or more levels of one or more intermediary nodes that may represent parent nodes and/or child nodes, and one or more leaf nodes that may represent grandchild nodes. As described above, a tree data structure may include nested tree structures (e.g., subtrees), which each may comprise a root node, one or more levels of one or more intermediary nodes, and one or more leaf nodes, or various subsets thereof.

In some examples, backup manager 154 may utilize a tree data structure based on a B+tree data structure. For instance, backup manager 154 may store and retrieve file system data from a tree data structure of tree data 120 comprising a root node and intermediary nodes that form an index for locating file system data. In this example, backup manager 154 may store file system data (e.g., an object or metadata) at leaf nodes. In some examples, backup manager 154 may store one or more references (e.g., pointers) to file system data at a leaf node rather than storing the file system data in the leaf node. For instance, backup manager 154 may store one or more references (e.g., pointers) to one or more chunks 164 of an object (which may be stored at storage system 115) at a leaf node rather than storing the object or one or more chunks 164 thereof at the leaf node. Backup manager 154 may limit the amount of data at (e.g., stored in or referenced by) leaf nodes of the tree data structure. For example, each leaf node may reference at most 256 KB of data of an object (e.g., file). As such, each leaf node may, at most, reference up to the size limit (e.g., 256 KB) of chunks 164 for the object. These chunks 164 up to the size limit referenced by a node may constitute a data brick representing at least a portion of chunks 164 that store the data of the object.

Backup manager 154 may generate an object metadata structure for some objects. For example, backup manager 154 may generate an object metadata for objects greater in size than the size limit (e.g., 256 KB). The object metadata structure may store metadata that enables chunks 164 associated with an object to be located. The object metadata structure may itself constitute a tree data structure that includes a root node, one or more levels of one or more intermediate nodes associated with the root node, and one or more leaf nodes associated with an intermediate node of the lowest intermediate level. An object metadata structure may, as such, be similar to a snapshot 152, but a leaf node of an object metadata structure may include an identifier of a data brick associated with one or more chunks 164 of the object and metadata associated with the one or more chunks 164 (e.g., chunk identifier, chunk object identifier, etc.).

A leaf node of snapshot 142 may include a reference to a root node of the object metadata structure corresponding to a data brick of an object. A leaf node of an object metadata structure may store metadata information, such as an identifier of a data brick to which one or more of chunks 164 are assigned. In some examples, the leaf node of the object metadata structure may store corresponding object offsets, corresponding chunk identifiers, and corresponding chunk-file identifiers for chunkfiles 162 storing the one or more chunks. In some examples, the location of the one or more chunks assigned to a data brick may be identified using a chunkfile metadata data structure. The chunkfile metadata data structure may include a plurality of entries where each entry includes a chunk identifier for a chunk of chunks 164 and a chunkfile identifier of a chunkfile of chunkfiles 162 that stores the chunk, an offset, and a size.

The tree data structure of tree data 120 may be structured according to one or more constraints. For example, one or more nodes (e.g., root node, intermediate node, leaf node) of the tree data structure may have the constraint of a minimum degree, maximum degree, or both. The minimum degree and maximum degree may respectively represent the minimum and maximum of a degree range constraint. The degree of a node may correspond to the number of keys in the node. Another example constraint may require that the number of children of a node is one more in number than the degree of the node, at least for particular levels of the tree data structure (e.g., intermediate node levels). The level of a node may correspond to the distance between the node and leaf nodes or the leaf node level (e.g., level 0). As such, an intermediate node that references a leaf node may be at level 1 and another intermediate node or a root node that references such intermediate node may be at level 2. In some examples, the maximum degree may be dynamic or different for different nodes. For instance, the maximum degree for a node may be based on the level of the node. To illustrate, a root node may have a maximum degree (e.g., max_degree) of 3 times the minimum degree (e.g., 3*min_degree), children of the root node (e.g., intermediate nodes) may have a maximum degree of 4 times the minimum degree (e.g., 4*min_degree), and grandchildren (e.g., leaf nodes) of the root node may have a maximum degree of 5 times the minimum degree (e.g., 5*min_degree). Truncation module 160 may cap (e.g., limit) these dynamic maximum degrees to the maximum degree established for the tree data structure.

In accordance with the techniques of this disclosure, backup manager 154 includes truncation module 160 to perform fast truncation of objects (e.g., files) stored by data platform 150. An object may be truncated by retaining (e.g., keeping) a portion of the object and removing the remaining portion of the object. The truncated object may correspond to the retained portion of the object and the remaining portion of the object may correspond to the truncated portion of the object.

Truncation of an object in a distributed file system may present challenges due to the need for garbage collection to reclaim storage space that is no longer used by the object after truncation. For example, to truncate an object, some data platforms may utilize background reference count based garbage collection to eventually (e.g., in the background) reclaim storage space that is no longer used by the object after truncation. The storage space may be reclaimed by deleting and/or updating nodes from a tree data structure that correspond to the truncated portion of the object on an individual basis. As such, the reclamation (e.g., garbage collection) of data may be a very costly in terms of consumption of computing resources (e.g., processor and/or memory resources). To illustrate, when truncating a large file (e.g., 100 gigabytes (GBs), 200 GBs, 500 GBs) to a smaller size (e.g., 1 GB) a large number of nodes (e.g., nodes corresponding to 380,000 data bricks, assuming 256 kilobyte (KB) data bricks) must be updated and/or deleted. As such, reference count based garbage collection may require linear running time, such as may be denoted as O(n) in Big O notation, where n is the number of leaf nodes in the tree data structure. Accordingly, with these data platforms, it may be impractical to perform truncation in line with a user request (e.g., on demand) and thus background garbage collection is required.

In accordance with the techniques described herein, rather than requiring a linear run time (e.g., O(n) time), truncation module 160 may perform truncation in logarithmic time, such as may be denoted as O(log(n)) in Big O notation, or better. As will be described further below, rather than deleting and/or updating nodes individually (e.g., one by one), truncation module 160 may truncate an object (e.g., file) by trimming a portion of a tree data structure for the object, such as by dereferencing a portion of the tree data structure. For example, truncation module 160 may dereference one or more intermediate nodes of a tree data structure, which efficiently deletes a plurality of nodes (e.g., leaf nodes and other intermediate nodes) referenced by these intermediate nodes in that dereferencing an intermediate node also dereferences each node referenced by the intermediate node.

The tree data structure of tree data 120 may include ordered keys which allow the tree data structure to be quickly updated and/or searched. For example, the tree data structure may correspond to a balanced B+tree structure with ordered keys. As will be described further herein, truncation module 160 may utilize the ordered keys to quickly trim the tree data structure. For example, to truncate an object, truncation module 160 may determine a key range corresponding to the nodes that reference the chunks 164 of the truncated object.

Truncation module 160 may trim the tree data structure by performing one or more recursive trimming processes, such as illustrated by the following example pseudocode.

```
void LeftTrim(Node node) {
    CHECK_GT(Level(node), 0);
    PinAndLock(node, mode=exclusive);
    auto value=Lookup(node);
    // Populate A and S as below from value.
    Let A={ordered list of (key, child) pair in node};
    Let S={ordered list of (key, child) pair to retain based on max_key};
    // Skip the current level.
    if (Len(S)==1 && Level(node)>1) {
```

```
        LeftTrim(child_node={child in S})
        return;
    }
    // Update root to point to the children of current level.
    if (S !=A) {
        new_root=root+dereference current children+S
        Update(new_root)
    }
}
```

As shown, in one example, truncation module 160 may execute the function LeftTrim with a node as a parameter (e.g., input), such as with a root node or other node of tree data structure as a starting node. The node used as input may be referred to as the current node. Truncation module 160 may execute the function CHECK_GT(Level(node), 0) to check whether the level of the current node satisfies a threshold level, in this case, level 0. For example, in the tree data structure, leaf nodes may correspond to level 0, child nodes (e.g., parent nodes of leaf nodes) may correspond to level 1, parent nodes (e.g., parent nodes of child nodes) may correspond to level 2, and a root node (e.g., parent nodes of parent nodes) may correspond to level 2. Truncation module 160, such as by executing CHECK_GT(Level(node), 0), may determine whether the level of the current node is greater than 0 and, if not, exit the LeftTrim( ) function.

Truncation module 160 may lock the current node, such as to prevent backup manager 154 or another element of data platform 150 from updating the current node. For example, truncation module 160 may execute the function PinAndLock(node, mode=exclusive) to lock the current node. In this manner, the current node may not be modified, such as by backup manager 154, file system manager 152, or another element of data platform 150, while truncation module 160 is trimming the tree data structure. Truncation module 160 may determine the child nodes of the current node, such as by executing Lookup(node). For example, truncation module 160 may determine an ordered list of child nodes for the current node. The ordered list may be ordered by the keys of the respective child nodes in the ordered list.

Truncation module 160 may determine a first ordered list that includes each child node of the current node and a second ordered list that includes only the child nodes of the current node that are to be retained. In the above example pseudocode, the first ordered list may correspond to the variable A={ordered list of (key, child) pair in node} and the second ordered list may correspond to the variable S={ordered list of (key, child) pair to retain based on max_key}. Truncation module 160 may determine to retain nodes based on a maximum key. For example, truncation module 160 may determine not to retain nodes with keys that do not satisfy the maximum key range (e.g., keys greater than the maximum key) and retain all other nodes.

In some examples, in addition or instead of a maximum key truncation module 160 may determine whether to retain a node based on a minimum key. For example, assuming truncation occurs at the beginning of the object, truncation module 160 may determine whether to retain nodes by determining whether the nodes include keys that satisfy the minimum key (e.g., greater than or equal to the minimum key). As another example, assuming truncation occurs between the beginning and end of the object, truncation module 160 may determine whether to retain nodes by determining whether the nodes include keys that satisfy a key range including a minimum key and a maximum key (e.g., keys between the minimum key to the maximum key).

Truncation module 160 may recursively traverse the tree data structure to trim the tree data structure, such as by recursively executing LeftTrimo. For example, truncation module 160 may skip (e.g., traverse from) the current level (e.g., the level of the current node) to a lower level when the second ordered list includes a single node and the current level is greater than level 1. To skip the current level, truncation module 160 may traverse to a node in the second ordered list. For example, truncation module 160 may execute LeftTrim(child_node={child in S}) to traverse to a node from the second ordered list.

If truncation module 160 does not skip the current level, truncation module 160 may determine whether to update the parent node of the current node. For example, truncation module 160 may update the parent node of the current node when the first ordered list includes a different set of nodes than the second ordered list, as shown by if (S !=A) in the above pseudocode. Truncation module 160 may dereference a node by removing pointers (e.g., references) to the node from the node's parent node. In some examples, truncation module 160 may create a copy of the parent node including references only to nodes in the second ordered list (e.g., the nodes to be retained), and replace the current parent node with the copy of the parent node.

With respect to the above example pseudocode for instance, truncation module 160 may execute new_root=root+dereference current children+S to create a new parent node of the current node (which may be a root node), new_root, that is a copy of the current node's current parent node without pointers to the child nodes of the current parent node and including pointers to the nodes in the second ordered list. As such, new_root may only reference the nodes that are to be retained. Truncation module 160 may then replace the current parent node with new_root, such as by executing Update(new_root). The resulting tree data structure thus includes the parent node, new_root, with references to the nodes that are to be retained. The nodes that are to be retained may correspond to the child nodes that reference leaf nodes corresponding to the data (e.g., chunks 164) of the truncated object.

Truncation module 160 may rebalance the tree data structure after dereferencing the portion of the tree data structure, such as to ensure each node conforms to one or more constraints for the tree data structure, such as the minimum degree and/or maximum degree constraints described above. Rebalancing may ensure traversal, modification, further truncation, searching, or other operations on the tree data structure remain efficient. Truncation module 160 may write a truncation intent to the object to indicate, such as to file system manager 152, backup manager 154, or other element of data platform 150, that the object will be truncated. The truncation intent may indicate the data of the object that is to be retained such as to allow truncation module 160 to determine the maximum key (or the minimum key or key range). Truncation module 160 may update the size of the file, such as in metadata of file system 153, to reflect and indicate the size of the object after truncation.

Truncation module 160 may rebalance the tree data structure by performing one or more balancing processes, such as illustrated by the example pseudocode below. As will be described further below, truncation module 160 may rebalance the tree data structure to satisfy the constraints of the tree data structure and/or to dereference nodes that are not to be retained that were not dereferenced during the trimming phase. Truncation module 160 may move one or more nodes (e.g., root node, intermediate node, leaf node) of the tree data structure to different parent nodes based on a minimum degree, maximum degree, or both. In some examples, the tree data structure may have constraints such that the leaf nodes may have a single key, level 1 nodes have the same number of keys as the respective number of child nodes at each level 1 node, and other nodes have a degree of one less than their respective number of child nodes.

```
void RightTrimAndFix(Node parent) {
  if (Level(parent)==1) {
    return;
  }
  PinAndLock(parent, mode=exclusive);
  auto parent_v=Lookup(parent);
  // Verify that parent is already fixed(has no garbage
      keys).
  // Get the right most node and its immediate sibling.
  left, right=parent_v→children[ . . . ];
  PinAndLock({left, right}, mode=exclusive);
  // (1) right node must have at least 1 valid child(left
      most) to retain.
  // (2) left node must not have any garbage key.
  // (3) parent has 1 spare key for deletion before violat-
      ing min_degree.
  // Given 3 conditions above, either RightShuffle or
      LeftJoin must succeed.
  // Caveat: (1) is not necessary when right node is a
      Level 1 node.
  // It may have all garbage keys but as there is no further
      descent
  // down the tree, the constraint of (degree>min_degree)
      for the
  // right most node is not required. The constraint should
      be
  // degree>=min_degree which can still be satisfied.
  auto new_right=TryRightShuffle(node, left, right);
  if (!new_right) {
    new_right=LeftJoin(node, left, right);
  }
  RightTrimAndFix(new_right);
}
```

As can be seen, in one example, truncation module 160 may recursively execute RightTrimAndFix( ) with a parent node as input to rebalance the tree data structure. Truncation module 160 may skip (e.g., traverse from) the parent node to a lower level node (e.g., a child node) based on the level of the node. For example, truncation module 160 may determine the level of the parent node, such as by executing Level(parent) and end execution if the level is equal to level 1 (e.g., if the node is a parent of a child node). Truncation module 160 may lock the parent node and rightmost node and the immediate sibling of the rightmost node, such as by executing PinAndLock(parent, mode=exclusive) and PinAndLock({left, right}, mode=exclusive). In this example, the right node may represent the rightmost child node of the parent node and the left node may represent the immediate sibling to the right node. As can be seen from the above example pseudocode, when the right node has at least one child (e.g., a leftmost child) to retain, the left node does not have any garbage keys (e.g., keys greater than a maximum key, keys less than a minimum key, keys outside a key range), and the parent node has one key that can be deleted without violating a minimum degree constraint, truncation module 160 may successfully shuffle (e.g., move) the child nodes in a rightward direction or join (e.g., move) the child nodes in a leftward direction to rebalance the tree data structure.

As such, when these attributes are present, truncation module 160 may execute TryRightShuffle( ) and, if TryRightShuffle( ) does not return a valid output (e.g., a valid node), truncation module 160 may instead execute LeftJoin( ) to rebalance the tree data structure. Truncation module 160 may not require that the right node have at least one child to retain when the right node is a level 1 node.

```
// Move children of left node to the right node such that
    both of them
// maintain a valid degree between min_degree and max_
    degree and hold on
// to no garbage keys.
// Returns nullptr if right shuffle is not feasible or
// Returns the right most node at current level if
// right shuffle is successful.
Node*TryRightShuffle(Node*parent,    Node*left,
    Node*right) {
  if (NumGarbageKeys(right)==0 && Degree(right)>
      min_degree) {
    // No updates required. No Left join required.
    // Nothing to fix, descent.
    return right;
  }
  // Right node must have one more key than min_degree
      as a LeftJoin
  // at the child level later may lead to key deletion at this
      level.
  Remove all garbage keys from the right node;
  Try to move some keys from left to right node such that
      the right node degree is at least, (min_degree+1) for
      non Level 1 node and min_degree for level 1 node;
  if (Degree(left)>=min_degree) {
    Create(new_left=left);
    Create(new_right=right);
    // Update parent to point to new_left and new_right.
    Update(parent)
    return new_right;
  }
  // Right shuffle is not possible. Fallback to LeftJoin.
  return nullptr;
}
```

As can be seen from the example pseudocode above, to shuffle nodes in a rightward direction, truncation module 160 may move the child nodes of the left node to the right node, such that both the left node and the right node maintain a degree between the minimum degree constraint and maximum degree constraint, without retaining any garbage keys. Truncation module 160 may determine the number of garbage keys, such as by executing NumGarbageKeys( ) to count the number of garbage keys. When there are no garbage keys and the degree of the right node satisfies the degree constraint (e.g., the degree is between the minimum degree and the maximum degree), truncation module 160 may refrain from moving any nodes and may return the right node. Truncation module 160 may the continue to rebalance the tree data structure by recursively continuing rebalancing from a new node, such as by executing RightTrimAndFixo with the right node as input. As shown above for example, truncation module 160 may execute RightTrimAndFix (new_right) to continue the recursive rebalancing process.

Truncation module 160 may remove all garbage keys from the right node. Truncation module 160 may move at least some keys from the left node to the right node such that the right node has a degree that equals the minimum degree for nodes at level 1 and at least one more than the minimum degree for nodes at other levels. The keys of a node may correspond to at least one pointer to a child node. As such, truncation module 160 may remove or move pointers by respectively removing or moving the corresponding key. Removing garbage keys may reclaim a significant portion of storage space. For example, after the trimming process, a significant portion of the tree data structure (e.g., ~3.5 GB for a 400 GB object, ~230 GB for a 24 terabyte (TB) object) may correspond to garbage keys. As such, the rebalancing phase may be advantageous in further reclaiming storage space not reclaimed by the trimming phase.

In the above example, when the degree of the left node after moving one or more keys is greater than or equal to the minimum degree, truncation module 160 may update the parent node to point to a copy of the left node and a copy of the right node and return the copy of the right node. Truncation module 160 may continue to rebalance the tree data structure by executing RightTrimAndFix( ) with such right node as input. When the degree of the left node is not greater than or equal to the minimum degree, truncation module 160 may determine the rightward movement of nodes is not possible. As such, truncation module 160 may return a null pointer, or other indication that the rightward movement is not possible. In response to such indication, truncation module 160 may perform leftward movement of the nodes, such as by executing LeftJoin( ).

```
// Move children from right node to left node such that left
   node maintains a
// degree between min_degree and max_degree and has no
   garbage keys.
// Returns the right most node at current level after
   performing left join.
Node*LeftJoin(Node*parent, Node*left, Node*right)
{
   // Left node must have one more key than min_degree
      as a LeftJoin at
   // lower level may lead to key deletion at this level.-
      Move all the valid keys from the right node to the left
      node and update the left node.
   // the right node can be left as it is because it will no
      longer be referenced.
   Create(new_left=left);
   // Update parent to point to new_left and remove old
      left, right references.
   Update(parent);
   return new_left;
}
```

As can be seen from the above pseudocode, to join nodes in a leftward direction, truncation module 160 may move child nodes from the right node to the left node such that the left node maintains a degree that is between the minimum degree and the maximum degree and retains no garbage keys. Truncation module 160 may move all the valid keys from the right node to the left node and update the left node. Truncation module 160 may otherwise refrain from modifying the right node because truncation module 160 will dereference the right node as the right node is no longer to be retained. In the example above, truncation module 160 may create a copy of the left node and update the parent node to reference the copy of the left node. Truncation module 160 may return the copy of the left node and recursively continue the rebalancing process, such as by executing RightTrimAndFix( ) with the left node as input.

Truncation module 160 may perform fast file truncation in phases. For example, to truncate an object, truncation module 160 may perform a trimming phase that trims the tree data structure and for the object, such as by dereferencing a portion of the tree data structure, and a rebalancing phase that rebalances the tree data structures after the tree data structure is trimmed. Truncation module 160 may reclaim the storage space used by each of the dereferenced nodes as well as the storage space used by data bricks, chunks 164, or other data referenced by the dereferenced nodes. In some examples, truncation module 160 may perform the trimming phase, the rebalancing phase, or both by traversing the tree data structure in a particular order. For example, truncation module 160 may perform the trimming phase, the rebalancing phase, or both by performing a breadth-first traversal of the tree data structure. Other examples of traversal orders that truncation module 160 may perform to traverse the tree data structure include depth-first traversals, such as pre-order, post-order, or in-order traversals.

System 190 of FIG. 1B is a variation of system 100 of FIG. 1A in that data platform 150 stores snapshots 142 using chunkfiles 162 stored to snapshot storage system 115 that resides on premises or, in other words, local to data platform 150. In some examples of system 190, storage system 115 enables users or applications to create, modify, or delete chunkfiles 162 via file system manager 152. In system 190, storage system 105 of FIG. 1B is the local storage system used by backup manager 154 for initially storing and accumulating chunks prior to storage at storage system 115. Backup manager 154 may store tree data 120 comprising nodes with references (e.g., pointers) to one or more chunks 164 at storage system 115. Though not shown, backup manager 154 may store tree data 120 at storage system 105 in addition to or instead of storage system 115, regardless of whether or not storage system 115 is remote or local to data platform 150, in some examples.

Figure 2:
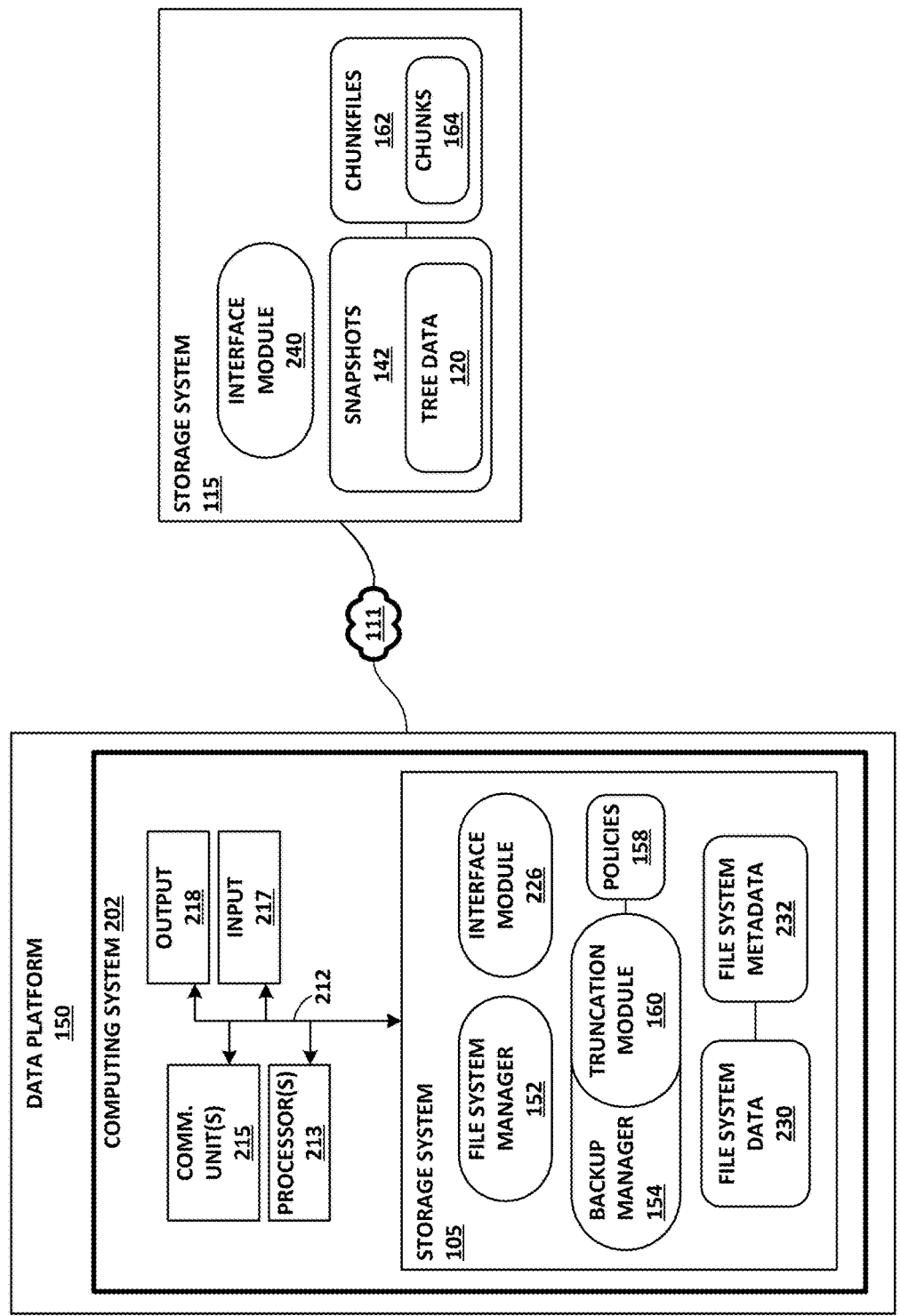
FIG. 2 is a block diagram illustrating an example system that performs fast truncation of large files, in accordance with techniques of this disclosure.

FIG. 2 is a block diagram illustrating example system 200, in accordance with techniques of this disclosure. System 200 of FIG. 2 may be described as an example or alternate implementation of system 100 of FIG. 1A or system 190 of FIG. 1B (where chunkfiles 162 are written to a local snapshot storage system 115). Backup manager 154 may store tree data 120 including one or more nodes with references (e.g., pointers) to chunks 164 at local snapshot storage system 115. One or more aspects of FIG. 2 may be described herein within the context of FIG. 1A and FIG. 1B.

In the example of FIG. 2, system 200 includes network 111, data platform 150 implemented by computing system 202, and storage system 115. In FIG. 2, network 111, data platform 150, and storage system 115 may correspond to network 111, data platform 150, and storage system 115 of FIG. 1A. Although only one snapshot storage system 115 is depicted, data platform 150 may apply techniques in accordance with this disclosure using multiple instances of snapshot storage system 115. The different instances of storage system 115 may be deployed by different cloud storage providers, the same cloud storage provider, by an enterprise, or by other entities.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of local storage system 105. Local storage system 105 may include interface module 226 and file system manager 152 as well as backup manager 154, one or more policies 158, and truncation module 160. One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated in FIG. 2 and described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over BLUETOOTH, GPS, NFC, ZIGBEE, and cellular networks (e.g., 3G, 4G, 5G), and WI-FI radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, BLUETOOTH, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 105 within computing system 202 may store information for processing during operation of computing system 202, such as with random access memory (RAM), Flash memory, solid-state disks (SSDs), hard disk drives (HDDs), etc. Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and local storage system 105 may retrieve, store, and/or execute the instructions and/or data of one or more applications, modules, or software. Processors 213 and/or storage devices of local storage system 105 may also be operably coupled to one or more other software and/or hardware components, including, but not limited to, one or more of the components of computing system 202 and/or one or more devices or systems illustrated as being connected to computing system 202.

File system manager 152 may perform functions relating to providing file system 153, as described above with respect to FIG. 1A. File system manager 152 may generate and manage file system metadata 232 for structuring file system data 230 for file system 153, and store file system metadata 232 and file system data 230 to local storage system 105. File system metadata 232 may include one or more tree data structures that describe objects within file system 153 and the file system 153 hierarchy, and can be used to write or retrieve objects within file system 153. File system manager 152 may interact with and/or operate in conjunction with one or more modules of computing system 202, including interface module 226 and backup manager 154.

Backup manager 154 may perform functions relating to backing up file system 153, as described above with respect to FIG. 1A, including operations described above with respect to truncation module 160. Backup manager 154 may generate one or more snapshots 142 and cause file system data 230 to be stored as tree data 120 and chunks 164 within chunkfiles 162 in snapshot storage system 115. Backup manager 154 may apply a deduplication process to selectively deduplicate chunks of objects within file system data 230, in accordance with one or more policies 158. Backup manager 154 may generate and manage tree data 120 for generating, viewing, retrieving, or restoring any of snapshots 142. Backup manager 154 may generate and manage tree data 120 for generating, viewing, retrieving, or restoring objects stored as chunks 164 (and references thereto) within chunkfiles 162, for any of snapshots 142. Stored objects may be represented and manipulated (e.g., truncated) using logical files for identifying chunks for the objects.

Local storage system 105 may store a chunk table that describes chunks 164. The chunk table may include respective chunk IDs for chunks 164 and may contain pointers to chunkfiles 162 and offsets within chunkfiles 162 for retrieving chunks 164 from storage system 115. Chunks 164 are written into chunkfiles 162 at different offsets. By comparing new chunk IDs to the chunk table, backup manager 154 can determine if the data already exists on the system. If the chunks already exist, data can be discarded and metadata for an object may be updated to reference the existing chunk. Backup manager 154 may use the chunk table to look up the chunkfile identifier for the chunkfile that contains a chunk.

Local storage system 105 may include a chunkfile table that describes respective physical or virtual locations of chunkfiles 162 on storage system 115, along with other metadata about the chunkfile, such as a checksum, encryption data, compression data, etc. In FIG. 2, backup manager 154 causes tree data 120 to be stored to local storage system 105. In some examples, backup manager 152 causes some or all of tree data 120 to be stored to snapshot storage system 115. Backup manager 152, optionally or in conjunction with file system manager 152, may use tree data 120 and/or file system metadata 232 to restore any of snapshots 142 to a file system implemented by data platform 150, which may be presented by file system manager 152 to other systems.

Interface module 226 may execute an interface by which other systems or devices may determine operations of file system manager 152 or backup manager 154. Another system or device may communicate via an interface of interface module 226 to specify one or more policies 158.

System 200 may be modified to implement an example of system 190 of FIG. 1B. In the modified system 200, chunkfiles 162 are stored to a local snapshot storage system 115 to support snapshots 142.

Interface module 240 of snapshot storage system 115 may execute an interface by which other systems or devices may create, modify, delete, or extend a "write once read many" (WORM) lock expiration time for any of chunkfiles 162. Interface module 240 may execute and present an API. The interface presented by interface module 240 may be a gRPC, HTTP, RESTful, command-line, graphical user, web, or other interface. Interface module 240 may be associated with use costs. One more methods or functions of the interface module 240 may impose a cost per-use (e.g., $0.10 to extend a WORM lock expiration time of chunkfiles 162).

Figure 3A:
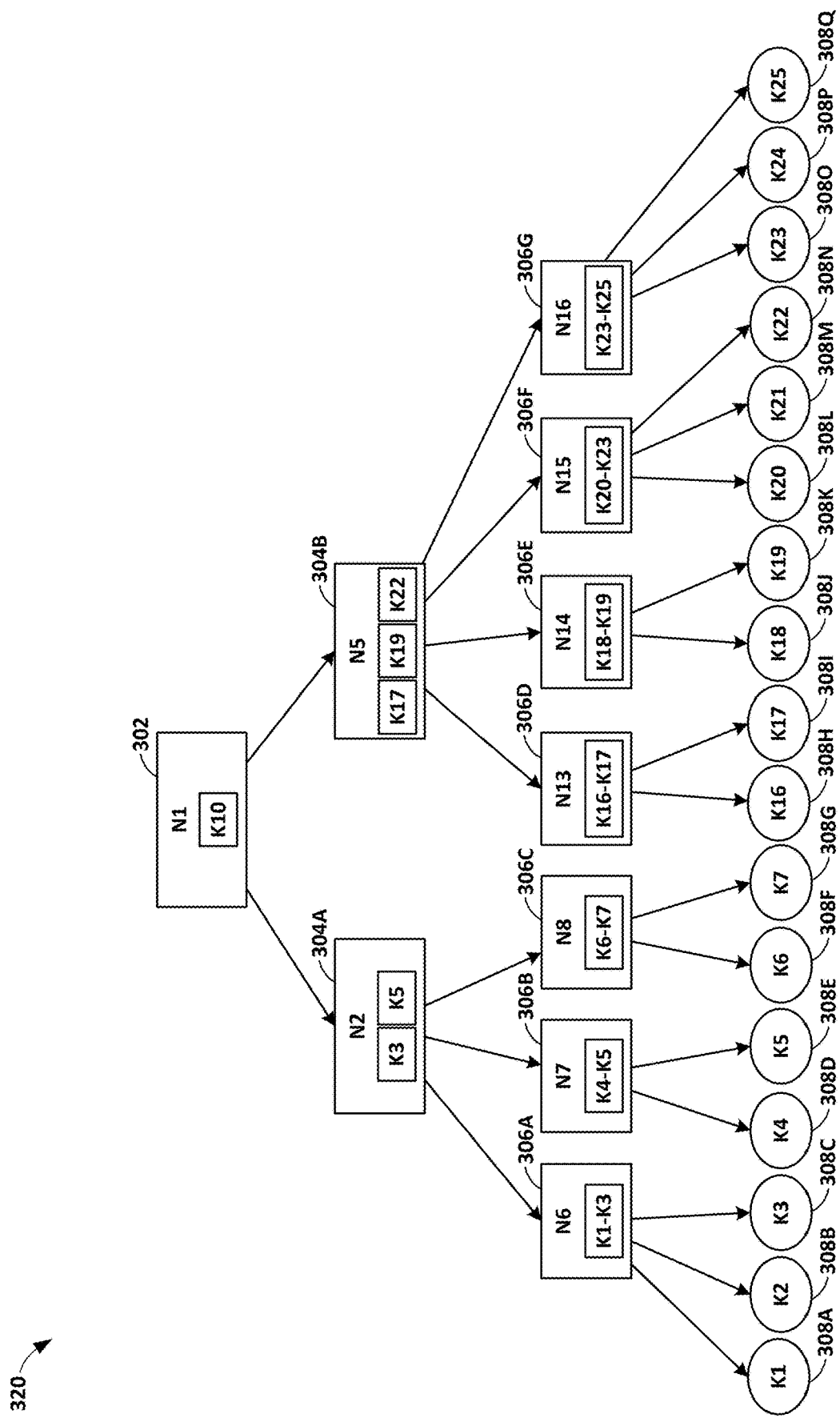
FIGS. 3A-3G are block diagrams illustrating a first example of tree data during fast file truncation, in accordance with techniques of this disclosure

FIGS. 3A-3G are block diagrams illustrating example tree data 320 during fast file truncation, in accordance with techniques of this disclosure. Referring to FIG. 3A for example, tree data 320 may be a tree data structure including one or more root nodes 302, one or more levels of one or more intermediate nodes, such as parent nodes 304A-304B (collectively, "parent nodes 304") and one or more child nodes 306A-306G (collectively, "child nodes 306"), and one or more leaf nodes 308A-308Q (collectively, "leaf nodes 308"). Though illustrated as including two levels of intermediate nodes, as illustrated by parent nodes 304 and child nodes 306, between root node 302 and leaf nodes 308, tree data 320 may include fewer or additional intermediate levels between root node 302 and leaf nodes 308. Tree data 320 may be an example of tree data 120 of FIGS. 1A-2.

The example of FIG. 3A illustrates tree data 320 including a tree data structure representing an object (e.g., file). Root node 302 includes one or more pointers to one or more other nodes representing the object. In some examples, root node 302 may form an entry point for the object in that the object may be retrieved by traversing tree data 320 starting from root node 302. Intermediate nodes, such as parent nodes 304, child nodes 306, or both, may be nodes to which another node points and include pointers to other nodes. Leaf nodes 308 may be at the bottom of tree data 320 and may have no pointers to other nodes, but may have pointers to data (e.g., data bricks, chunks 164) of the object or include such data of the object. Tree data 320 may be nested within another tree data structure, such as a tree data structure constituting a snapshot 142.

The tree data structure may include one or more levels to which the nodes of the tree data structure belong. As described above, each level may correspond to a respective distance from a leaf node level. For example, the level to which leaf nodes 308 belong, may be considered level 0, the level to which the parent nodes of leaf nodes 308, child nodes 306, belong may be considered level 1, and the level to which parent nodes of child nodes 306, parent nodes 304, belong may be considered level 2. As such, the level to which root node 302 belongs, may be considered level 3.

In some examples, each node 302, 304, 306, 308 in tree data 320 may have a node identifier, tree identifier, or both. A node identifier may be a name that uniquely identifies a node 302, 304, 306, 308. In the example of FIG. 3A for instance, root node 302 includes a node identifier of N1, parent node 304A includes a node identifier of N2, parent node 304B, includes a node identifier of N5, child node 306A includes a node identifier of N6, and so on and so forth. A tree identifier may be a string or other identifier that identifies the tree data structure to which the node belongs.

As described above, in some examples, nodes other than leaf nodes 308 (e.g., root node 302, parent nodes 304, child nodes 306) may form an index through which data (e.g., individual chunks 164) of an object at leaf nodes 308 may be located. For instance, root node 302, parent nodes 304, and child nodes 306 may include one or more keys K1-K25 that indicate which pointer to traverse to locate a particular node (e.g., a leaf node of leaf nodes 308 with a desired data of the object). In the example of FIG. 3A, root node 302 has the key K10, parent node 304A has the keys K3 and K5, and parent node 304B has the keys K17, K19, and K20. Each key may have one or more pointers which may be selected for traversal based on a comparison between the key and a selected key. The selected key may be used to identify a leaf node of leaf nodes 308 at which desired data of the object may be located. For example, the leaf node may include a reference to the desired data or contain the desired data.

Truncation module 160 may use keys differently based on the level of a node. Referring to FIG. 3A for example, for each key of a node that is not in level 0 (e.g., a node of leaf nodes 308) or in level 1 (e.g., a node of child nodes 306), such as a node of parent nodes 304 or root node 302, truncation manager 160 may traverse a first pointer when the selected key is less than or equal to the key and traverse a second pointer when the selected key is greater than the key. For each node that is a level 1 node (e.g., a node of child nodes 306), there may be a one to one correspondence between keys and the children (e.g., leaf nodes 308) of the node such that truncation manager 160 may traverse the pointer corresponding to the key that matches the selected key to locate the leaf node of leaf nodes 308 that corresponds to the selected key. For each node that is a level 0 node (e.g., a node of leaf nodes 308), a key may be assigned. As shown in the example of FIG. 3A for instance, key K1 may be assigned to leaf node 308A, key K2 may be assigned to leaf node 308B, key K3 may be assigned to leaf node 308C, and so on and so forth. As such, leaf node 308A may be located using key K1, leaf node 308B may be located using key K2, leaf node 308C may be located using key K3, and so on and so forth.

Truncation module 160 may traverse the tree data structure of tree data 320 using these keys. In the example of FIG. 3A for instance, child node 306A has the keys K1, K2, and K3, child node 306B has the keys K4 and K5, child node 306C has the keys K6 and K7, child node 306D has the keys K16 and K17, and so on and so forth. As such, to locate a selected key of K1 at leaf node 308A truncation module 160 may traverse the pointer (e.g., the leftmost pointer) of root node 302 to parent node 304A since K1 is less than or equal to the key K10 at root node 302. At parent node 304A, truncation module 160 may traverse the pointer to child node 306A since the K1 is less than or equal to the key K3 at parent node 304A. At child node 306A, truncation module 160 may traverse the pointer corresponding to key K1 to arrive at leaf node 308A with the key K1, which matches the selected key K1. As another example, to locate a selected key of K4, at parent node 304A, truncation module 160 may traverse the pointer to child node 306B since K4 is greater than the key K3 and but not greater than or equal to key K5 at parent node 304A. At child node 306B, truncation manager 160 may traverse the pointer corresponding to key K4 which references leaf node 308D. Similarly, to locate a selected key of K6, at parent node 304A, truncation module 160 may traverse the pointer to child node 306C since K6 is not less than or equal to (e.g., is greater than) the key K5 at parent node 304A. At child node 306C, truncation module may traverse the pointer corresponding to key K6 which references leaf node 308F.

Though described above with respect to truncation module 160, backup manager 154 may traverse the tree data structure of tree data 320 as described above with respect to truncation module 160. For example, truncation module 160, backup manager 154, or both may perform a breadth-first or other traversal of tree data 320 based on keys of one or more of nodes 302, 304, 306, 308, such as to locate, insert, modify, or delete data for an object within tree data 320. Though shown with a particular number of root, intermediate, and leaf nodes 302, 304, 306 and a particular number of keys K1-K25, various examples of tree data 320 may include fewer or additional nodes and keys.

Figure 3B:
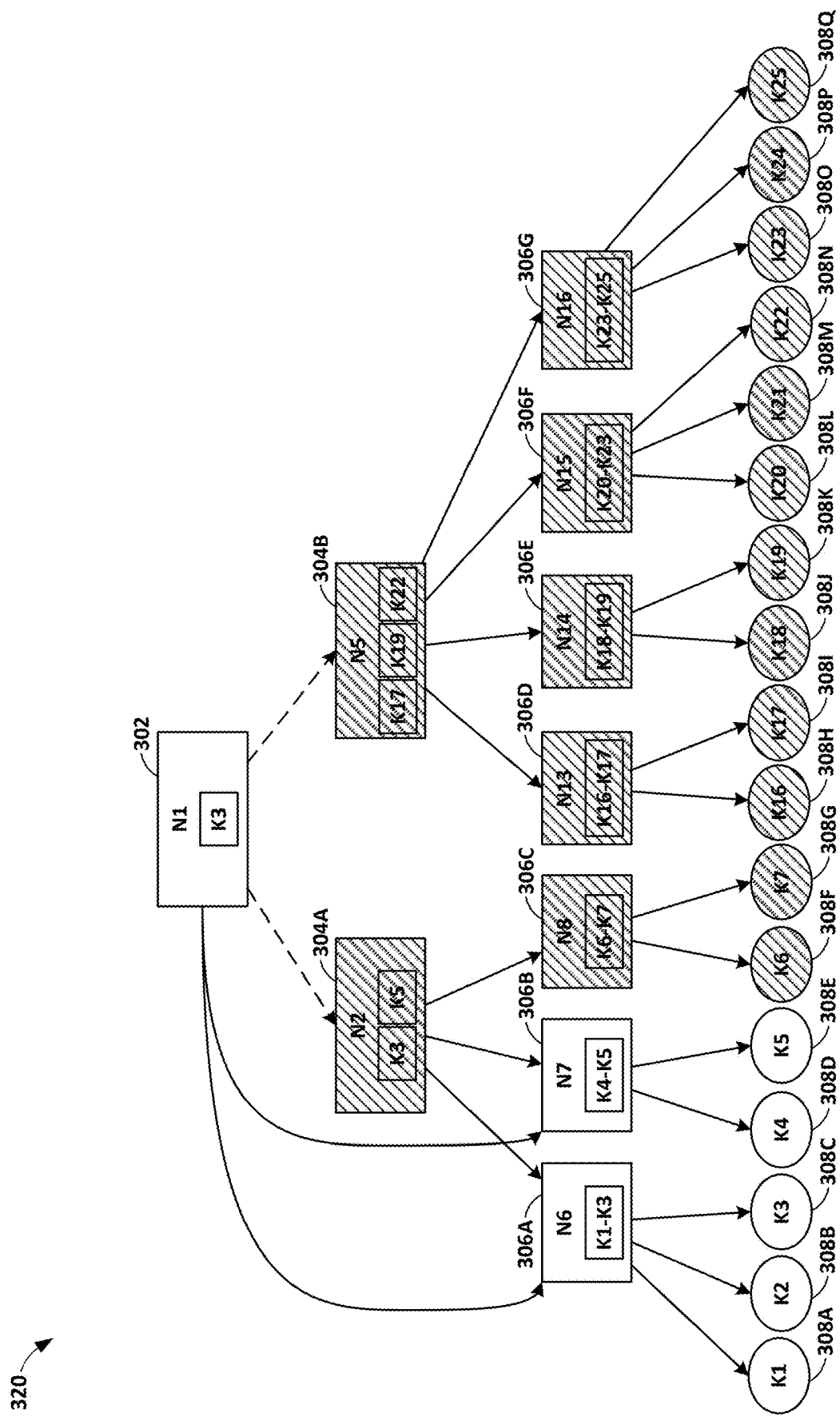

FIG. 3B may represent an example of the trimming phase, which may be performed by truncation module 160 executing a process corresponding to the LeftTrim( ) function described above. FIGS. 3C-3G may represent example of the rebalancing phase, which may be executed by truncation module 160 executing the RightTrimAndFix( ) function described above. For illustrative purposes, in the examples of FIGS. 3A-3G, the object represented by the tree data structure of tree data 320 is truncated such that, rather than including each of leaf nodes 308A-308Q and the data of the object at leaf nodes 308A-308Q, the object includes only leaf nodes 308A-308D and the data of the object at leaf nodes 308A-308D. As can be seen, leaf nodes 308A-308D respectively include the key range K1 to K4, with the minimum key being K1 and the maximum key being K4.

As described above, the tree data structure may include ordered keys K1-K25 which allow the tree data structure to be quickly updated and/or searched. Truncation module 160 may utilize these ordered keys to quickly dereference nodes. Referring to the example of FIG. 3A, to perform fast file truncation, truncation module 160 may skip (e.g., traverse from) each node of the tree data structure, at a level higher than level 1, if only a single child node is to be retained at the level. For example, at root node 302, truncation module 160 may traverse to parent node 304A because, between parent node 304A and parent node 304B, only parent node 304A is to be retained. Truncation module 160 may determine to only retain parent node 304A because parent node 304A includes one or more keys that do not satisfy the maximum key K4 (e.g., that are greater than the maximum key).

At parent node 304A, truncation module 160 may determine that child nodes 306A and child node 306B are to be retained since these nodes include keys that satisfy the maximum key K4 (e.g., that are less than the maximum key). As such, rather than including only a single child node to be retained, parent node 304A includes two child nodes, child node 306A and child node 306B, to be retained. Accordingly, rather than refraining from skipping (e.g., traversing from) parent node 304A, truncation module 160 may determine whether a first ordered list of each child node of parent node 304A matches a second ordered list of child nodes of parent nodes 304A that are to be retained. If the first ordered list does not match the second ordered list, truncation module 160 may update root node 302, such that root node 302 only references the nodes in the second ordered list, child node 306A and child node 306B, which thereby dereferences the other child node of parent node 304A, child node 306C. In this example, the first ordered list includes child nodes 306A-306C and the second ordered list includes child node 306A and child node 306B and therefore the first ordered list and the second ordered list do not match.

Truncation module 160 may continue the recursive trimming phase by traversing to other children of root node 302, such as parent node 304B. Truncation module 160 may determine whether a first ordered list of each child node of parent node 304B matches a second ordered list of child nodes of parent node 304B that are to be retained. In this case the first ordered list includes child nodes 306D-306G and the second ordered list is empty. Truncation module 160 may determine the second ordered list is empty because each of child nodes 306D-306G includes a key that does not satisfy the maximum key K4 (e.g., is greater than the maximum key). As such, truncation module 160 may determine the first ordered list and the second ordered list do not match. Similar to above, truncation module 160 may accordingly update root node 302 to reference only the nodes in the second ordered list, which is empty.

In this manner, truncation module 160 dereferences the entire subtree referenced by parent node 304B. The result of the trimming phase relative to the example of FIG. 3A is illustrated in the example of FIG. 3B. As can be seen by the shading of FIG. 3B, truncation module 160 dereferenced parent node 304A and parent node 304B and child nodes 306C-306G. Truncation module 160 may dereference a node by removing (e.g., deleting) a pointer to the node from the node's parent node. As shown by the broken line depictions thereof, truncation module 160 removes the pointer from root node 302 to parent node 304A and the pointer from root node 302 to parent node 304B to respectively dereference parent node 304A and parent node 304B. Truncation module 160 may dereference every descendant node of a node by dereferencing the node. With respect to the example of FIG. 3B for instance, truncation module 160 may dereference child nodes 306D-306G by virtue of dereferencing parent node 304B. Similarly, truncation module 160 may dereference leaf nodes 308H-308Q through the dereferencing of child nodes 306D-306G and dereference leaf node 308F and leaf node 308G through the dereferencing of child node 306C. Truncation module 160 may consider dereferenced nodes as orphaned nodes and may reclaim the storage space used by dereferenced nodes, including storage space used by data (e.g., chunks 164) corresponding to dereferenced nodes.

Figure 3C:
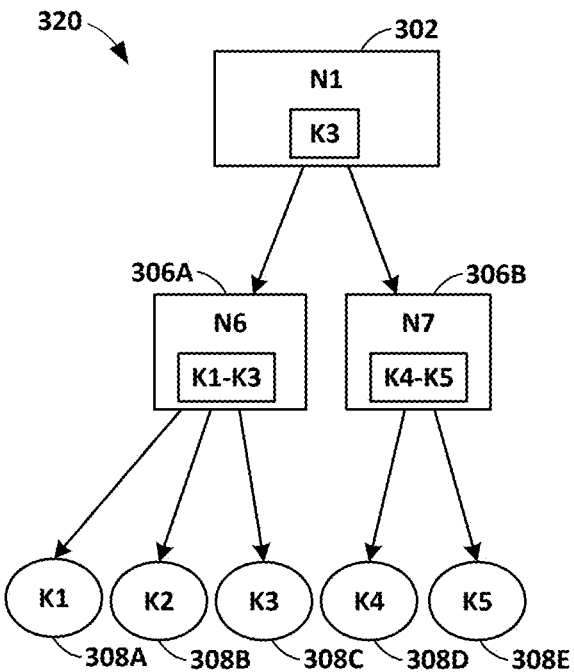

The example of FIG. 3C illustrates the tree data structure subsequent to truncation module 160 trimming the tree data structure. By dereferencing parent node 304A and parent node 304B from root node 302 and causing root node 302 to reference child node 306A and child node 306B, truncation module 160 may reduce the height of the tree data structure of tree data 320. As can be seen, the tree data structure of FIG. 3C has a reduced height relative to the tree data structure of FIG. 3B.

Figure 3D:
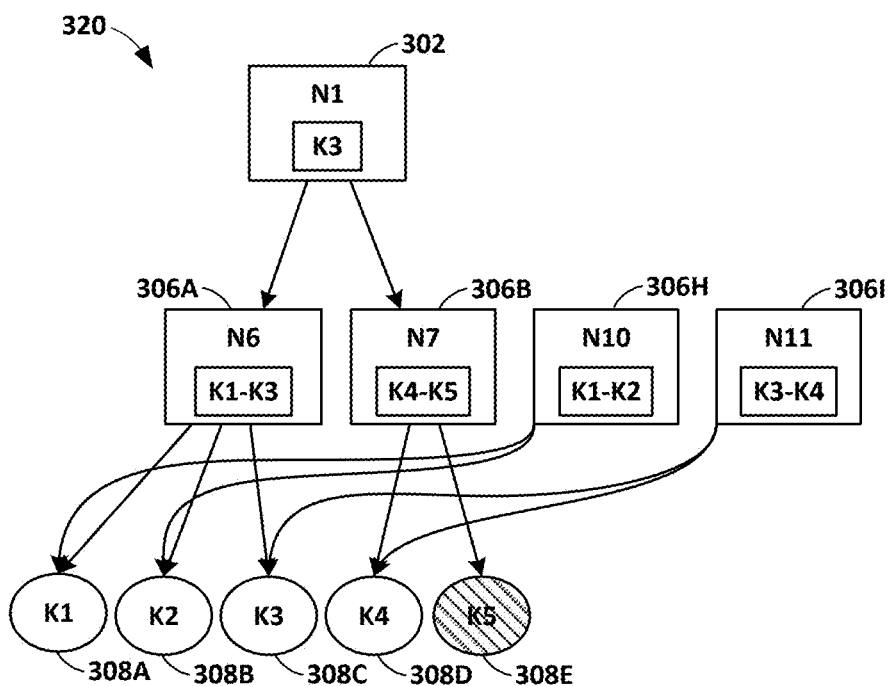

Referring to the example of FIG. 3D, truncation module 160 may perform a rebalancing phase of the fast file truncation. As described above, the rebalancing phase may include shuffling (e.g., moving) nodes in a rightward direction, joining (e.g., moving) nodes in a leftward direction, or both. To move a node, truncation module 160 may move a key corresponding to the pointer to the node to another node. As described above, during rebalancing, when the rightmost child node has at least one child (e.g., a leftmost child) to retain, and the immediate sibling of the rightmost child node does not have any garbage keys (e.g., keys outside the key range), and the parent node has one key that can be deleted without violating the minimum degree constraint, truncation module 160 may successfully shuffle the child nodes in a rightward direction or join the child nodes in a leftward direction to rebalance the tree data structure.

Truncation module 160 may dereference any nodes that are not to be retained that are still referenced. In the example of FIG. 3D for instance, leaf node 308E is still referenced by child node 306B subsequent to the trimming phase. To maintain the efficiency (e.g., low computing resource consumption) of the trimming phase, some nodes that are not to be retained may continue to be referenced subsequent to truncation module 160 performing the trimming phase. For example, rather than traversing nodes on an individual basis to dereference the nodes, truncation module 160 may dereference multiple nodes by dereferencing parent nodes of these nodes during the trimming phase, such as described above. Some nodes that are not to be retained, such as leaf node 308E for example, may continue to be retained when truncation module 160 dereferences nodes in this manner. As such, truncation module 160 may dereference nodes during the rebalancing phase, such as by removing pointers to such nodes or by refraining from moving such nodes and dereferencing the parent nodes of such nodes, as will be described further below. As shown by the shading thereof, leaf node 308E in the example of FIG. 3D has been dereferenced during the rebalancing phase. Dereferencing nodes that are not to be retained (e.g., nodes with garbage keys) may reclaim a significant portion of storage space. For example, after the trimming process, a significant portion of the tree data structure (e.g., ~3.5 GB for a 400 GB object, ~230 GB for a 24 terabyte (TB) object) may correspond to garbage keys.

At root node 302 of the example of FIG. 3D, the rightmost child node, also referred to as the right node above, may be child node 306B and the immediate sibling to child node 306B, also referred to as the left node above, may be child node 306A. To shuffle nodes rightward, truncation module 160 may attempt to move one or more leaf nodes 308 from child node 306A rightward to child node 306B, such that the degree of child node 306B is equal to the minimum degree constraint. For illustrative purposes, the minimum degree with respect to the example of FIG. 3D is assumed to be 2 for level 1 nodes (e.g., child nodes 306). As such, truncation module 160 may determine whether the degree of child node 306A is greater than the minimum degree so as to avoid violating the minimum degree constraint at child node 306A by moving leaf nodes from child node 306A. Responsive to determining the degree of child node 306A, in this case 3, is greater than the minimum degree, truncation module 160 may move a key from child node 306A to child node 306B. For example, truncation module 160 may move key K3 from child node 306A to child node 306B thereby also moving the corresponding pointer to leaf node 308C to child node 306B. Accordingly, by moving leaf node 308C, truncation module 160 may cause child node 306A and child node 306B to both have a degree of 2.

Figure 3E:
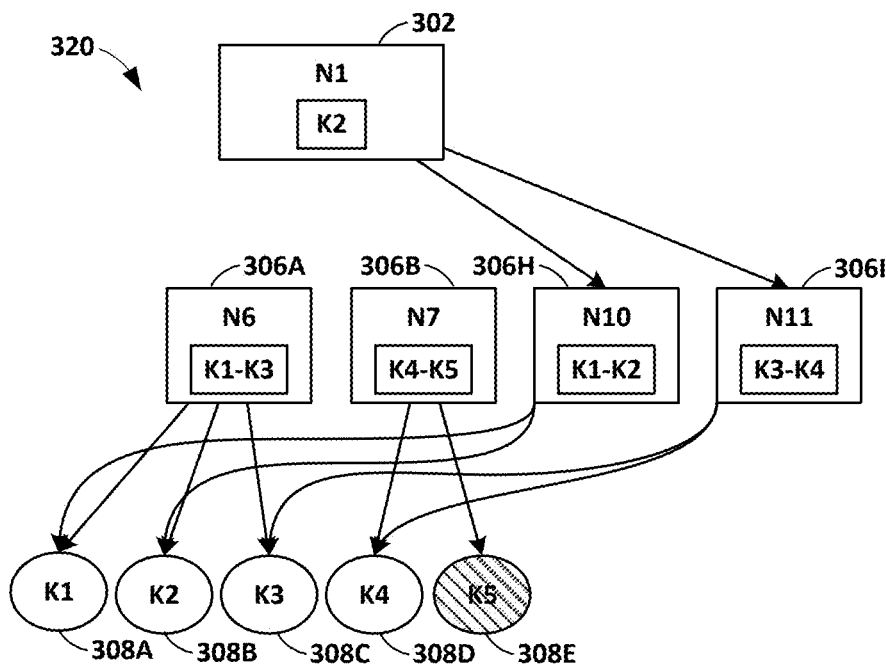
Figure 3F:
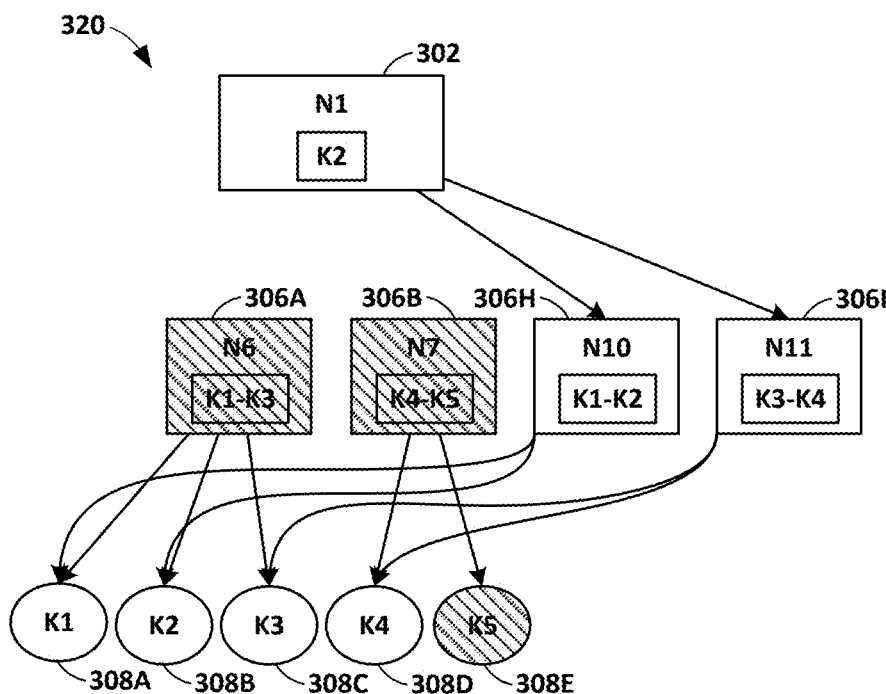
Figure 3G:
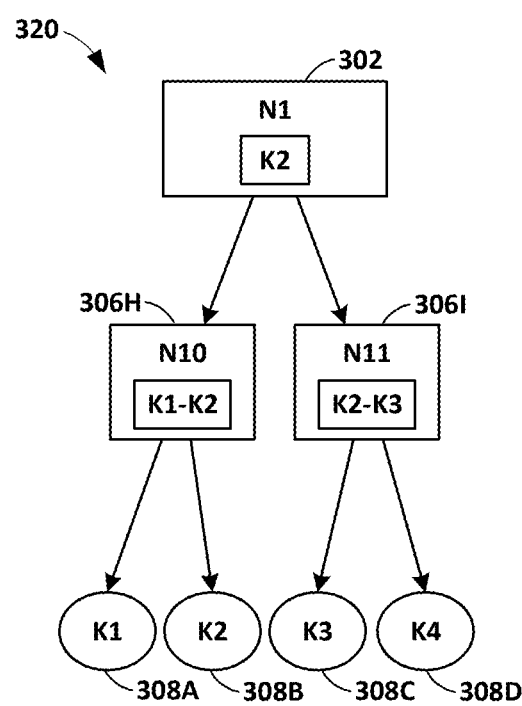

As described above, truncation module 160 may utilize a copy of nodes to perform rebalancing. Referring to the example of FIG. 3D for instance, truncation module 160 may create a copy of child node 306A and a copy of child node 306B, which are respectively represented by child node 306H and child node 306I in FIG. 3D. As can be seen, child node 306H and child node 306I respectively represent a copy of child node 306A and a copy of child node 306B subsequent to moving key K3 and the corresponding pointer to leaf node 308C to child node 306B, in that, child node 306H includes pointers to leaf node 308A and leaf node 308B and child node 306I includes pointers to leaf node 308C and leaf node 308D.

Where copies of nodes are used, truncation module 160 may replace copied nodes with their respective copies. For example, truncation module 160 may cause root node 302 to reference child node 306H and child node 306I, which respectively are copies child node 306A and child node 306B, such as shown in the example of FIG. 3E. Truncation module 160 may dereference the copied nodes, child node 306A and child node 306B, such as shown in the example of FIG. 3F. The resulting tree data structure of tree data 320, which represents the truncated object, is shown in the example of FIG. 3G. Truncation module 160 may dereference leaf node 308E by refraining from moving the key K5 to leaf node 308E to another node or by removing key K5, thereby dereferencing leaf node 308E when child node 306B is dereferenced. For example, truncation module 160 may determine key K5 is a garbage key in that K5 does not satisfy the maximum key K4 (e.g., is greater than maximum key) and therefore refrain from moving key K5 or remove key K5.

Figure 4A:
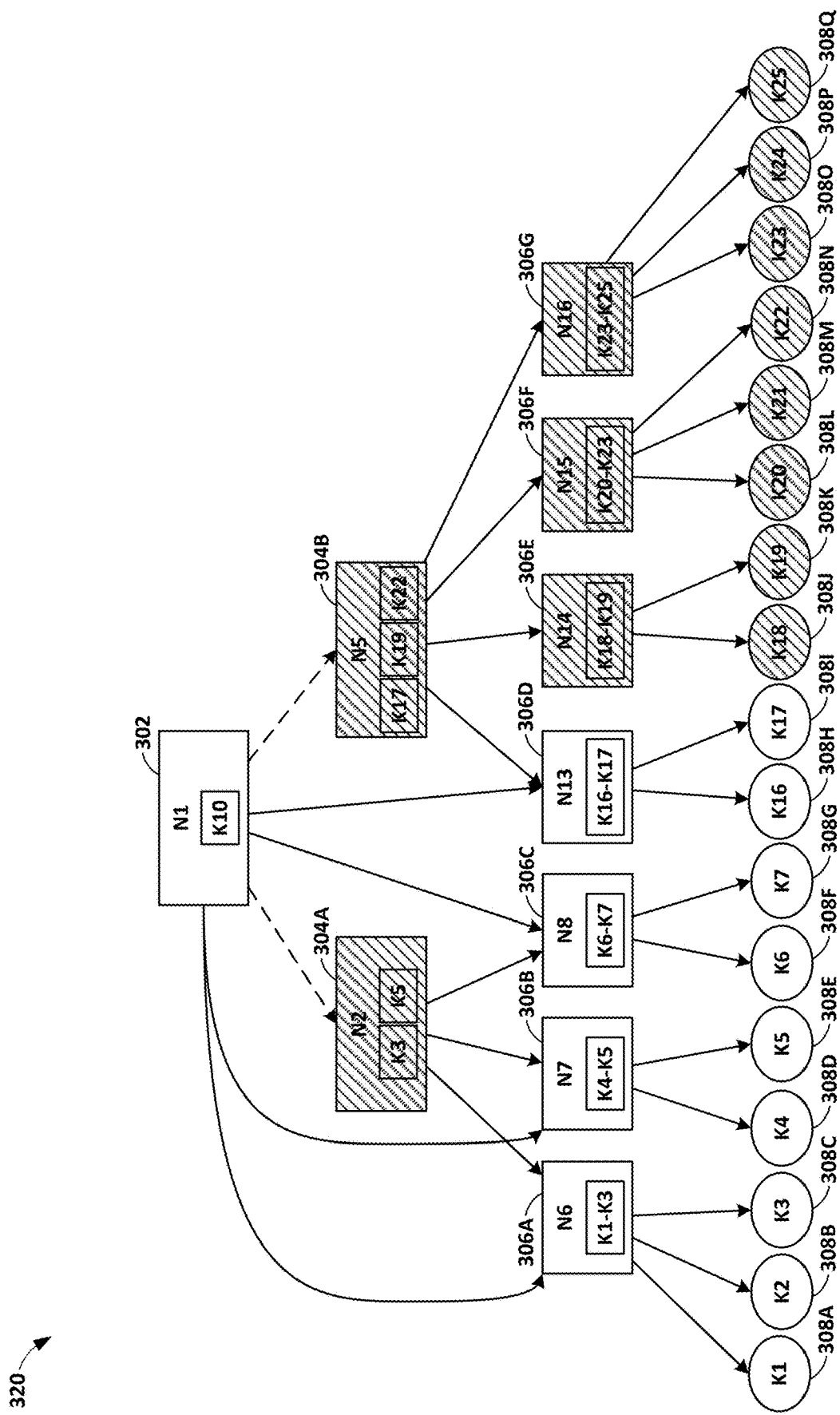
FIGS. 4A-4D are block diagrams illustrating a second example of tree data during fast file truncation, in accordance with techniques of this disclosure.
Figure 4B:
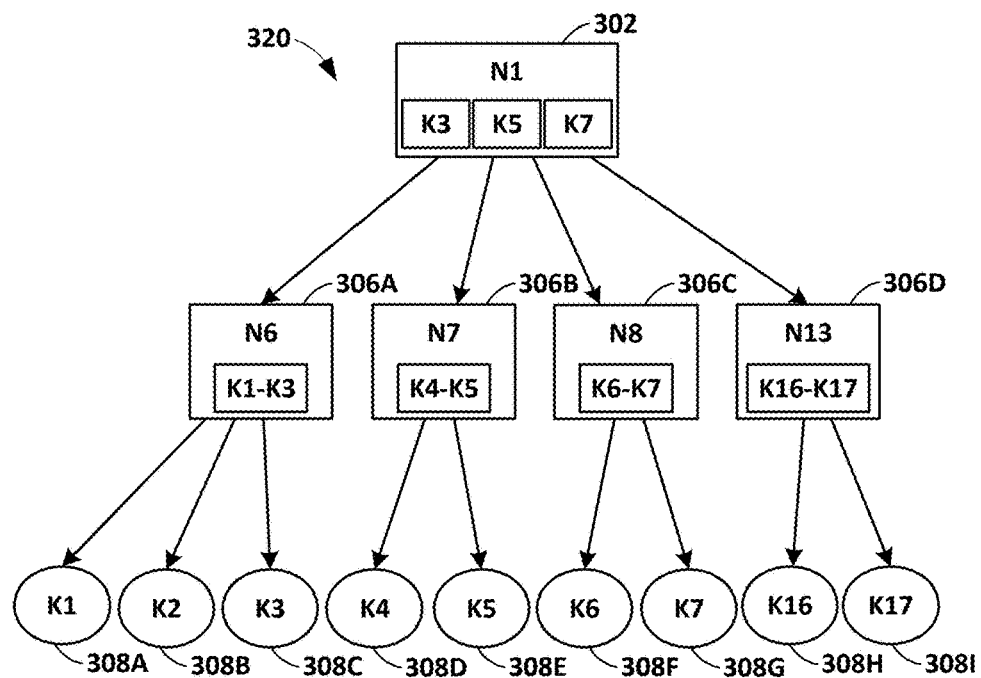
Figure 4C:
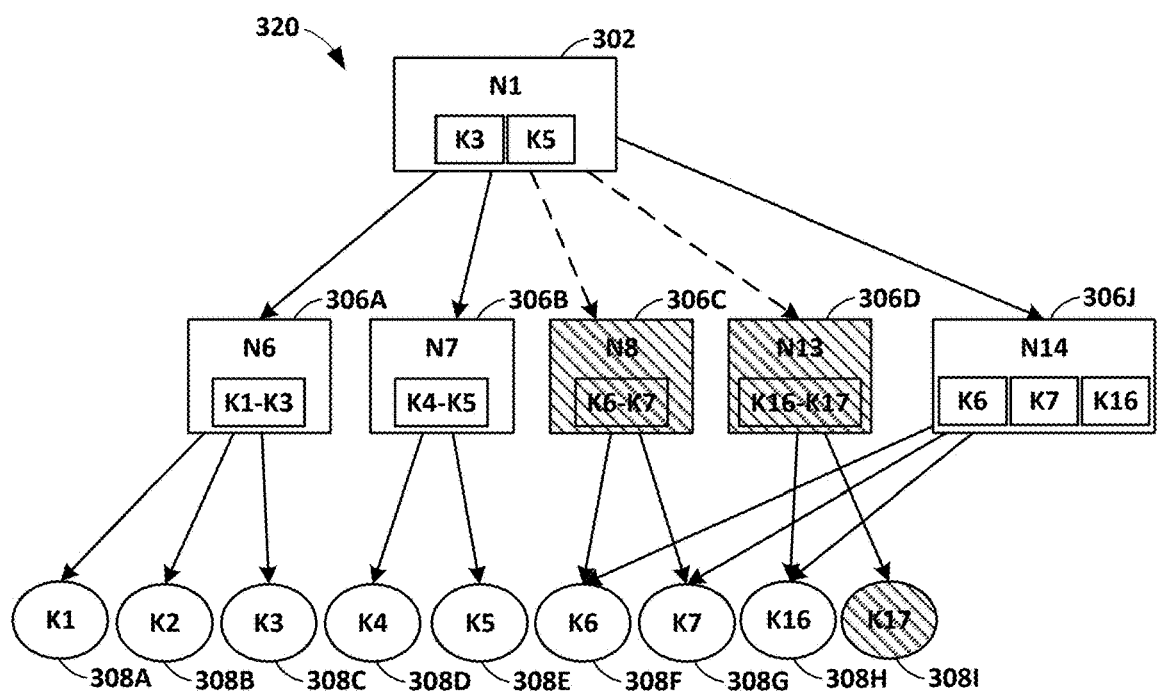
Figure 4D:
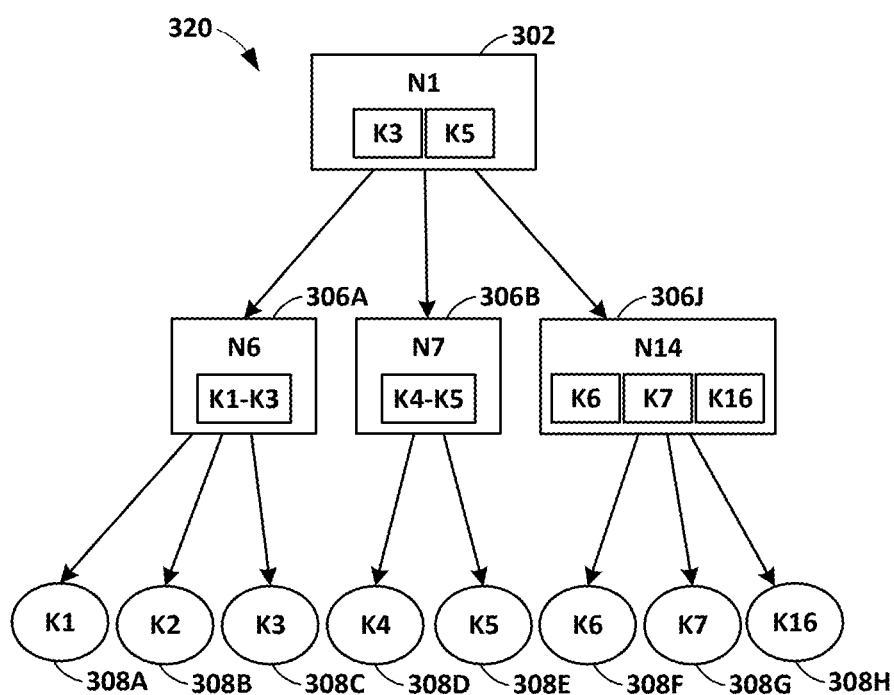

FIGS. 4A-4D are block diagrams illustrating a second example of tree data during fast file truncation, in accordance with techniques of this disclosure. This second example may utilize the tree data structure from tree data 320 of FIG. 3A to represent the object to be truncated. FIG. 4A may represent an example of the trimming phase applied to the object, which may be performed by truncation module 160 executing a process corresponding to the LeftTrim( ) function described above. FIGS. 4B-4D may represent example of the rebalancing phase, which may be executed by truncation module 160 executing the RightTrimAndFix ( ) function described above. For illustrative purposes, in the examples of FIGS. 4A-4D, the object represented by tree data 320 is truncated such that, rather than including each of leaf nodes 308A-308Q and the data referenced by leaf nodes 308A-308Q, the object includes only leaf nodes 308A-308I and the data referenced by leaf nodes 308A-308I. As such, truncation module 160 may determine key range K1 to K16, with a minimum key of K1 and a maximum key of K16, corresponds to the leaf nodes, leaf nodes 308A-308I, which represent the data to be retained in the truncated object.

Referring back to the example of FIG. 4A, truncation module 160 has performed the trimming phase relative to parent node 304A. As can be seen, truncation module 160 has updated root node 302 such that root node 302 references the child nodes of parent node 304A, child nodes 306A-306C, which are to be retained, and has dereferenced parent node 304A. As shown in the example of FIG. 4A for instance, truncation module 160 has updated root node 302 to include pointers to child nodes 306A-306C.

Truncation module 160 may continuing the recursive trimming phase by traversing to parent node 304B. At parent node 304B, truncation module 160 may determine that child node 306D is to be retained since child node 306D includes a key that satisfies the maximum key K16 (e.g., a key less than or equal to the maximum key). As such, parent node 304B includes one child node, child node 306D, to be retained. Accordingly, rather than refraining from skipping (e.g., traversing from) parent node 304B, truncation module 160 may determine whether a first ordered list of each child node of parent node 304B matches a second ordered list of child nodes of parent nodes 304B that are to be retained. If the first ordered list does not match the second ordered list, truncation module 160 may update root node 302, such that root node 302 only references the nodes in the second ordered list, child node 306D, which thereby dereferences the other child nodes of parent node 304B, child nodes 306E-306G. In this example, the first ordered list includes child nodes 306D-306G and the second ordered list includes child node 306D and therefore the first ordered list and the second ordered list do not match.

As can be seen by the shading of FIG. 4A, truncation module 160 dereferenced parent node 304A and parent node 304B and child nodes 306E-306G. Truncation module 160 may dereference every descendant node of a node by dereferencing the node. With respect to the example of FIG. 4A for instance, truncation module 160 may dereference leaf nodes 308J-308Q by virtue of dereferencing child nodes 306E-306G. The example of FIG. 4B illustrates the result of the trimming phase performed by truncation module 160 relative to the example of FIG. 4A. By dereferencing parent node 304A and parent node 304B from root node 302 and causing root node 302 to reference child nodes 306A-306D, truncation module 160 may reduce the height of the tree data structure of tree data 320. As can be seen, the tree data structure of FIG. 4B has a reduced height relative to the tree data structure of FIG. 4A.

Referring to the example of FIG. 4B, truncation module 160 may perform a rebalancing phase of the fast file truncation. As described above, the rebalancing phase may include shuffling (e.g., moving) nodes in a rightward direction, joining (e.g., moving) nodes in a leftward direction, or both. As described above, when the rightmost child node has at least one child (e.g., a leftmost child) to retain, and the immediate sibling of the rightmost child node does not have any garbage keys, and the parent node has one key that can be deleted without violating the minimum degree constraint, truncation module 160 may successfully shuffle the child nodes in a rightward direction or join the child nodes in a leftward direction to rebalance the tree data structure.

At root node 302 of the example of FIG. 4B, the rightmost child node, also referred to as the right node above, may be child node 306D and the immediate sibling to child node 306D, also referred to as the left node above, may be child node 306C. Truncation module 160 may attempt to move one or more leaf nodes 308 from child node 306A rightward to child node 306B. For illustrative purposes, the minimum degree with respect to the example of FIG. 4B is assumed to be 2 for level 1 nodes (e.g., child nodes 306). As such, truncation module 160 may be unable to move leaf nodes 308 from child node 306C without violating the minimum degree constraint in that moving a leaf node from child node 306C results in child node 306C having a degree of 1 which is less than the minimum degree.

In attempting to shuffle one or more child nodes in a rightward direction, truncation module 160 may dereference leaf node 308I. For example, truncation module 160 may determine key K17 is a garbage key in that K17 does not satisfy the maximum key K16 (e.g., is greater than the maximum key) and therefore refrain from moving key K17, which may ultimately result in dereferencing leaf node 308E, such as shown in the example of FIG. 4C.

Responsive to determining shuffling rightward cannot be successfully completed, truncation module 160 may perform a join by moving one or more child nodes in a leftward direction. With respect to the example of FIG. 4C for instance, truncation module 160 may move leaf node 308H from child node 306D to child node 306C, such as by moving key K16 from child node 306D to child node 306C. As described above, truncation module 160 may utilize a copy of nodes to perform rebalancing. In the example of FIG. 4C for instance, truncation module 160 may create a copy of child node 306C as represented by child node 306J. As can be seen, child node 306J represents a copy of child node 306C subsequent to moving key K16 and the corresponding pointer to leaf node 308H to child node 306C, in that, child node 306J includes pointers to each of leaf nodes 308F-308H.

Where copies of nodes are used, truncation module 160 may replace copied nodes with their respective copies. For example, truncation module 160 may cause root node 302 to reference child node 306J, which is the copy of child node 306C, such as shown by the pointer from root node 302 to child node 306J in the example of FIG. 4C. Truncation module 160 may dereference the right node, child node 306D which no longer includes any child nodes that are to be retained. By dereferencing child node 306D, truncation module 160 also dereferences leaf node 308I. The resulting tree data structure of tree data 320, which represents the truncated object, is shown in the example of FIG. 4D.

Figure 5:
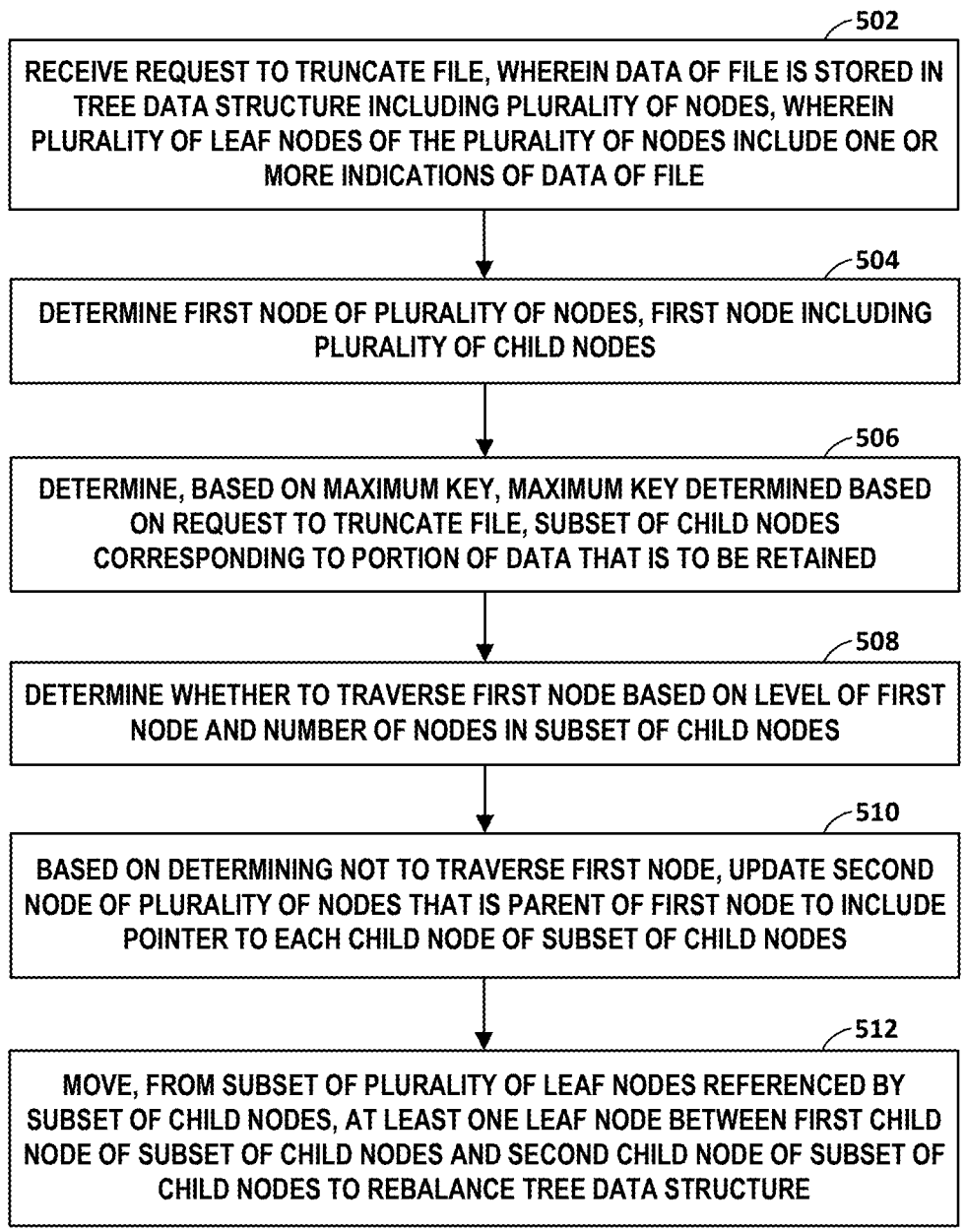
FIG. 5 is a flowchart illustrating example operation of a data platform in performing fast truncation of large files.

FIG. 5 is a flowchart illustrating example operation of a data platform in performing fast file truncation. Aspects of FIG. 5 may be described below in the context of FIGS. 1-4D. Data platform 150 may receive a request to truncate an object, such as a file, where data of the file is stored in a tree data structure, such as of tree data 320, including a plurality of nodes (502). For example, a plurality of leaf nodes 308 may include one or more indications of the data of the file. For instance, each of the one or more indications of the data of the file may include a pointer to the data (e.g., one or more chunks 164) of the file.

Data platform 150 may determine a first node of the plurality of nodes, the first node including a plurality of child nodes 306 (504). Data platform 150 may determine, based on a maximum key, a subset of the child nodes 306 corresponding to a portion of the data that is to be retained (506). Data platform 150 may determine the maximum key determined on the request to truncate the file. For example, the request may indicate an end of the file after truncation. Data platform 150 may determine a key of a leaf node of leaf nodes 308 that corresponds to the end of the file and use such key as the maximum key. Each of child nodes 306 may include at least one key of a plurality of ordered keys (e.g., keys K1 to K25). As such, to determine the subset of the child nodes 306 corresponding to the portion of the data that is to be retained data platform 150 may compare the at least one key of each of child nodes 306 to the maximum key. Data platform may determine a child node of child nodes 306 does not correspond to the portion of data that is to be retained when a key of the child node does not satisfy a maximum key, minimum key, or key range.

Data platform 150 may determine whether to traverse the first node based on a level of the first node and a number of nodes in the subset of child nodes (508). The child nodes 306 may correspond to a first ordered list including all children of the first node and the subset of child nodes 306 may correspond to a second ordered list including children of the first node that are to be retained. Data platform 150 may traverse the first node to a lower level node when the level of the first node is level 1 and there is more than one child node in the subset of child nodes.

Based on determining not to traverse the first node, data platform 150 may update a second node of the plurality of nodes that is a parent of the first node to include a pointer to each child node of the subset of child nodes 306 (510). For example, data platform 150 may update a root node 302 that is a parent of the first node to include a pointer to each child node of the subset of child nodes 306. Data platform 150 may dereference the first node after updating the second node of the plurality of nodes to include the pointer to each child node of the subset of child nodes 306. In this manner data platform 150 may trim the tree data structure and reduce the height of the tree data structure, such as shown in the examples of FIG. 3C and FIG. 4B.

Data platform 150 may move, from a subset of the plurality of leaf nodes 308 referenced by subset of child nodes 306, at least one leaf node between a first child node of the subset of child nodes 306 and a second child node of the subset of child nodes 306 to rebalance the tree data structure (512). For example, data platform may shuffle the at least one leaf node rightward or join the at least one leaf node leftward, such as shown in the examples of FIG. 3D and FIG. 4C. For instance, to move the at least one leaf node between the first child node and the second child node data platform 150 may move the at least one leaf node rightward from the first child node to the second child node based on a degree of the first child node exceeding a minimum degree threshold.

As another example, to move the at least one leaf node between the first child node and the second child node data platform 150 may move the at least one leaf node leftward from the second child node to the first child node based on a degree of the first child being within a minimum degree threshold and a maximum degree threshold. Data platform 150 may determine whether moving the at least one leaf node rightward from the first child node to the second child node will violate a constraint, such as a degree constraint, of the tree data structure. As such, data platform 150 may move the at least one leaf node leftward from the second child node to the first child node based on determining moving the at least one leaf node rightward from the first child node to the second child node will violate the constraint. For example, data platform 150 may refrain from moving the at least one leaf node leftward when such a move violates the constraint.

This disclosure includes the following examples.

Example 1: A method includes receiving, by a data platform implemented by a computing system, a request to truncate a file, wherein data of the file is stored in a tree data structure including a plurality of nodes, wherein a plurality of leaf nodes of the plurality of nodes include one or more indications of the data of the file; determining, by the data platform, a first node of the plurality of nodes, the first node including a plurality of child nodes; determining, by the data platform and based on a maximum key, the maximum key determined based on the request to truncate the file, a subset of the child nodes corresponding to a portion of the data that is to be retained; determining, by the data platform, whether to traverse the first node based on a level of the first node and a number of nodes in the subset of child nodes; based on determining not to traverse the first node, updating, by the data platform, a second node of the plurality of nodes that is a parent of the first node to include a pointer to each child node of the subset of child nodes; and moving, by the data platform and from a subset of the plurality of leaf nodes referenced by the subset of child nodes, at least one leaf node between a first child node of the subset of child nodes and a second child node of the subset of child nodes to rebalance the tree data structure.

Example 2: The method of example 1, further comprising dereferencing, by the data platform, the first node after updating the second node of the plurality of nodes to include the pointer to each child node of the subset of child nodes.

Example 3: The method of any of examples 1 and 2, wherein moving the at least one leaf node between the first child node and the second child node comprises moving, by the data platform, the at least one leaf node rightward from the first child node to the second child node based on a degree of the first child node exceeding a minimum degree threshold.

Example 4: The method of any of examples 1 through 3, wherein moving the at least one leaf node between the first child node and the second child node comprises moving, by the data platform, the at least one leaf node leftward from the second child node to the first child node based on a degree of the first child being within a minimum degree threshold and a maximum degree threshold.

Example 5: The method of example 4, further includes determining, by the data platform, whether moving the at least one leaf node rightward from the first child node to the second child node will violate a constraint of the tree data structure, wherein moving the at least one leaf node leftward from the second child node to the first child node is based on determining moving the at least one leaf node rightward from the first child node to the second child node will violate the constraint.

Example 6: The method of any of examples 1 through 5, wherein each of the plurality of child nodes includes at least one key of a plurality of ordered keys and determining the subset of the child nodes corresponding to the portion of the data that is to be retained comprises comparing the at least one key of each of the plurality of child nodes to the maximum key.

Example 7: The method of any of examples 1 through 6, wherein each of the one or more indications of the data of the file includes a pointer to the data of the file.

Example 8: A computing system includes a memory storing instructions; and processing circuitry that executes the instructions to: receive a request to truncate a file, wherein data of the file is stored in a tree data structure including a plurality of nodes, wherein a plurality of leaf nodes of the plurality of nodes include one or more indications of the data of the file; determine a first node of the plurality of nodes, the first node including a plurality of child nodes; determine, based on a maximum key, the maximum key determined based on the request to truncate the file, a subset of the child nodes corresponding to a portion of the data that is to be retained; determine whether to traverse the first node based on a level of the first node and a number of nodes in the subset of child nodes; based on determining not to traverse the first node, update a second node of the plurality of nodes that is a parent of the first node to include a pointer to each child node of the subset of child nodes; and move, from a subset of the plurality of leaf nodes referenced by the subset of child nodes, at least one leaf node between a first child node of the subset of child nodes and a second child node of the subset of child nodes to rebalance the tree data structure.

Example 9: The computing system of example 8, wherein the processing circuitry executes the instructions to dereference the first node after updating the second node of the plurality of nodes to include the pointer to each child node of the subset of child nodes.

Example 10: The computing system of any of examples 8 and 9, to move the at least one leaf node between the first child node and the second child node the processing circuitry executes the instructions to move the at least one leaf node rightward from the first child node to the second child node based on a degree of the first child node exceeding a minimum degree threshold.

Example 11: The computing system of any of examples 8 through 10, to move the at least one leaf node between the first child node and the second child node the processing circuitry executes the instructions to move the at least one leaf node leftward from the second child node to the first child node based on a degree of the first child being within a minimum degree threshold and a maximum degree threshold.

Example 12: The computing system of example 11, wherein the processing circuitry executes the instructions to: determine whether moving the at least one leaf node rightward from the first child node to the second child node will violate a constraint of the tree data structure, wherein moving the at least one leaf node leftward from the second child node to the first child node is based on determining moving the at least one leaf node rightward from the first child node to the second child node will violate the constraint.

Example 13: The computing system of any of examples 8 through 12, wherein each of the plurality of child nodes includes at least one key of a plurality of ordered keys and to determine the subset of the child nodes corresponding to the portion of the data that is to be retained the processing circuitry executes the instructions to compare the at least one key of each of the plurality of child nodes to the maximum key.

Example 14: The computing system of any of examples 8 through 13, wherein each of the one or more indications of the data of the file includes a pointer to the data of the file.

Example 15: Non-transitory computer-readable storage media including instructions that, when executed, cause processing circuitry of a computing system to receive a request to truncate a file, wherein data of the file is stored in a tree data structure including a plurality of nodes, wherein a plurality of leaf nodes of the plurality of nodes include one or more indications of the data of the file; determine a first node of the plurality of nodes, the first node including a plurality of child nodes; determine, based on a maximum key, the maximum key determined based on the request to truncate the file, a subset of the child nodes corresponding to a portion of the data that is to be retained; determine whether to traverse the first node based on a level of the first node and a number of nodes in the subset of child nodes; based on determining not to traverse the first node, update a second node of the plurality of nodes that is a parent of the first node to include a pointer to each child node of the subset of child nodes; and move, from a subset of the plurality of leaf nodes referenced by the subset of child nodes, at least one leaf node between a first child node of the subset of child nodes and a second child node of the subset of child nodes to rebalance the tree data structure.

Example 16: The non-transitory computer-readable storage media of example 15, wherein the instructions, when executed, cause the processing circuitry to dereference the first node after updating the second node of the plurality of nodes to include the pointer to each child node of the subset of child nodes.

Example 17: The non-transitory computer-readable storage media of any of examples 15 and 16, to move the at least one leaf node between the first child node and the second child node the instructions, when executed, cause the processing circuitry to move the at least one leaf node rightward from the first child node to the second child node based on a degree of the first child node exceeding a minimum degree threshold.

Example 18: The non-transitory computer-readable storage media of any of examples 15 through 17, to move the at least one leaf node between the first child node and the second child node the instructions, when executed, cause the processing circuitry to move the at least one leaf node leftward from the second child node to the first child node based on a degree of the first child being within a minimum degree threshold and a maximum degree threshold.

Example 19: The non-transitory computer-readable storage media of example 18, wherein the instructions, when executed, cause the processing circuitry to: determine whether moving the at least one leaf node rightward from the first child node to the second child node will violate a constraint of the tree data structure, wherein moving the at least one leaf node leftward from the second child node to the first child node is based on determining moving the at least one leaf node rightward from the first child node to the second child node will violate the constraint.

Example 20: The non-transitory computer-readable storage media of any of examples 15 through 19, wherein each of the plurality of child nodes includes at least one key of a plurality of ordered keys and to determine the subset of the child nodes corresponding to the portion of the data that is to be retained the instructions, when executed, cause the processing circuitry to compare the at least one key of each of the plurality of child nodes to the maximum key.

Example 21: A computer-program product that includes instructions that cause one or more processors to perform any combination of the methods of examples 1-7.

Example 22: A computing system including means for performing each step of any combination of the methods of examples 1-7.

Although the techniques described in this disclosure are primarily described with respect to a backup or snapshot function performed by a backup manager of a data platform, similar techniques may additionally or alternatively be applied for an archive, replica, or clone function performed by the data platform. In such cases, snapshots 142 would be archives, replicas, or clones, respectively.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method comprising:
   receiving, by a data platform implemented by a computing system, a request to remove a portion of a file, wherein data of the file is stored in a tree data structure including a plurality of nodes, wherein a plurality of leaf nodes of the plurality of nodes include one or more indications of the data of the file;
   determining, by the data platform, a first node of the plurality of nodes, the first node including a plurality of child nodes;
   determining, by the data platform and based on a maximum key, the maximum key determined based on the request to remove a portion of the file, a subset of the child nodes corresponding to a portion of the data that is to be retained;
   determining, by the data platform, whether to traverse the first node based on a level of the first node and a number of nodes in the subset of child nodes;
   based on determining not to traverse the first node, updating, by the data platform, a second node of the plurality of nodes that is a parent of the first node to include a pointer to each child node of the subset of child nodes; and
   moving, by the data platform and from a subset of the plurality of leaf nodes referenced by the subset of child nodes, at least one leaf node between a first child node of the subset of child nodes and a second child node of the subset of child nodes to rebalance the tree data structure.

2. The method of claim 1, further comprising dereferencing, by the data platform, the first node after updating the second node of the plurality of nodes to include the pointer to each child node of the subset of child nodes.

3. The method of claim 1, wherein moving the at least one leaf node between the first child node and the second child node comprises moving, by the data platform, the at least one leaf node rightward from the first child node to the second child node based on a degree of the first child node exceeding a minimum degree threshold.

4. The method of claim 1, wherein moving the at least one leaf node between the first child node and the second child node comprises moving, by the data platform, the at least one leaf node leftward from the second child node to the first child node based on a degree of the first child being within a minimum degree threshold and a maximum degree threshold.

5. The method of claim 4, further comprising:
determining, by the data platform, whether moving the at least one leaf node rightward from the first child node to the second child node will violate a constraint of the tree data structure,
wherein moving the at least one leaf node leftward from the second child node to the first child node is based on determining moving the at least one leaf node rightward from the first child node to the second child node will violate the constraint.

6. The method of claim 1, wherein each of the plurality of child nodes includes at least one key of a plurality of ordered keys and determining the subset of the child nodes corresponding to the portion of the data that is to be retained comprises comparing the at least one key of each of the plurality of child nodes to the maximum key.

7. The method of claim 1, wherein each of the one or more indications of the data of the file includes a pointer to the data of the file.

8. A computing system comprising:
a memory storing instructions; and
processing circuitry that executes the instructions to:
receive a request to remove a portion of a file, wherein data of the file is stored in a tree data structure including a plurality of nodes, wherein a plurality of leaf nodes of the plurality of nodes include one or more indications of the data of the file;
determine a first node of the plurality of nodes, the first node including a plurality of child nodes;
determine, based on a maximum key, the maximum key determined based on the request to remove a portion of the file, a subset of the child nodes corresponding to a portion of the data that is to be retained,
determine whether to traverse the first node based on a level of the first node and a number of nodes in the subset of child nodes;
based on determining not to traverse the first node, update a second node of the plurality of nodes that is a parent of the first node to include a pointer to each child node of the subset of child nodes; and
move, from a subset of the plurality of leaf nodes referenced by the subset of child nodes, at least one leaf node between a first child node of the subset of child nodes and a second child node of the subset of child nodes to rebalance the tree data structure.

9. The computing system of claim 8, wherein the processing circuitry executes the instructions to dereference the first node after updating the second node of the plurality of nodes to include the pointer to each child node of the subset of child nodes.

10. The computing system of claim 8, to move the at least one leaf node between the first child node and the second child node the processing circuitry executes the instructions to move the at least one leaf node rightward from the first child node to the second child node based on a degree of the first child node exceeding a minimum degree threshold.

11. The computing system of claim 8, to move the at least one leaf node between the first child node and the second child node the processing circuitry executes the instructions to move the at least one leaf node leftward from the second child node to the first child node based on a degree of the first child being within a minimum degree threshold and a maximum degree threshold.

12. The computing system of claim 11, wherein the processing circuitry executes the instructions to:
determine whether moving the at least one leaf node rightward from the first child node to the second child node will violate a constraint of the tree data structure,
wherein moving the at least one leaf node leftward from the second child node to the first child node is based on determining moving the at least one leaf node rightward from the first child node to the second child node will violate the constraint.

13. The computing system of claim 8, wherein each of the plurality of child nodes includes at least one key of a plurality of ordered keys and to determine the subset of the child nodes corresponding to the portion of the data that is to be retained the processing circuitry executes the instructions to compare the at least one key of each of the plurality of child nodes to the maximum key.

14. The computing system of claim 8, wherein each of the one or more indications of the data of the file includes a pointer to the data of the file.

15. Non-transitory computer-readable storage media comprising instructions that, when executed, cause processing circuitry of a computing system to:
receive a request to remove a portion of a file, wherein data of the file is stored in a tree data structure including a plurality of nodes, wherein a plurality of leaf nodes of the plurality of nodes include one or more indications of the data of the file;
determine a first node of the plurality of nodes, the first node including a plurality of child nodes;
determine, based on a maximum key, the maximum key determined based on the request to remove a portion of the file, a subset of the child nodes corresponding to a portion of the data that is to be retained;
determine whether to traverse the first node based on a level of the first node and a number of nodes in the subset of child nodes;
based on determining not to traverse the first node, update a second node of the plurality of nodes that is a parent of the first node to include a pointer to each child node of the subset of child nodes; and
move, from a subset of the plurality of leaf nodes referenced by the subset of child nodes, at least one leaf node between a first child node of the subset of child nodes and a second child node of the subset of child nodes to rebalance the tree data structure.

16. The non-transitory computer-readable storage media of claim 15, wherein the instructions, when executed, cause the processing circuitry to dereference the first node after updating the second node of the plurality of nodes to include the pointer to each child node of the subset of child nodes.

17. The non-transitory computer-readable storage media of claim 15, to move the at least one leaf node between the first child node and the second child node the instructions, when executed, cause the processing circuitry to move the at least one leaf node rightward from the first child node to the second child node based on a degree of the first child node exceeding a minimum degree threshold.

18. The non-transitory computer-readable storage media of claim 15, to move the at least one leaf node between the first child node and the second child node the instructions, when executed, cause the processing circuitry to move the at least one leaf node leftward from the second child node to the first child node based on a degree of the first child being within a minimum degree threshold and a maximum degree threshold.

19. The non-transitory computer-readable storage media of claim 18, wherein the instructions, when executed, cause the processing circuitry to:
determine whether moving the at least one leaf node rightward from the first child node to the second child node will violate a constraint of the tree data structure, wherein moving the at least one leaf node leftward from the second child node to the first child node is based on determining moving the at least one leaf node rightward from the first child node to the second child node will violate the constraint.

20. The non-transitory computer-readable storage media of claim 15, wherein each of the plurality of child nodes includes at least one key of a plurality of ordered keys and to determine the subset of the child nodes corresponding to the portion of the data that is to be retained the instructions, when executed, cause the processing circuitry to compare the at least one key of each of the plurality of child nodes to the maximum key.

\* \* \* \* \*